(12) United States Patent
Boon

(10) Patent No.: US 6,359,929 B1
(45) Date of Patent: Mar. 19, 2002

(54) IMAGE PREDICTIVE DECODING METHOD, IMAGE PREDICTIVE DECODING APPARATUS, IMAGE PREDICTIVE CODING APPARATUS, AND DATA STORAGE MEDIUM

(75) Inventor: Choong Seng Boon, Moriguchishi (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/109,896

(22) Filed: Jul. 2, 1998

(30) Foreign Application Priority Data

Jul. 4, 1997 (JP) .............................. 9-179761

(51) Int. Cl.$^7$ ................................ H04N 7/18
(52) U.S. Cl. .............................. 375/240.16; 375/240.17
(58) Field of Search ................................ 348/409, 410, 348/411, 412, 413, 415, 416, 699, 700; 375/240.12, 240.13, 240.14, 240.15, 240.16, 240.17, 240.26, 240.27

(56) References Cited

U.S. PATENT DOCUMENTS

| | | | |
|---|---|---|---|
| 5,210,605 A | | 5/1993 | Zaccarin et al. |
| 5,687,097 A | | 11/1997 | Mizusawa et al. |
| 5,715,008 A | * | 2/1998 | Sekiguchi et al. .......... 348/416 |
| 5,745,183 A | * | 4/1998 | Lam ....................... 375/240.15 |
| 5,812,197 A | * | 9/1998 | Chan et al. ................. 348/416 |
| 5,745,169 A | * | 4/1999 | Murphy et al. ......... 375/240.16 |
| 5,905,542 A | * | 5/1999 | Linzer ........................ 348/699 |
| 6,115,070 A | * | 9/2000 | Song et al. ............. 375/240.15 |

OTHER PUBLICATIONS

Luo et al., "A New Prediction Search Algorithm for Block Motion Estimation in Video Coding", IEEE Transactions on Consumer Electronics, vol. 43, No. 1, Feb. 1997, pp. 56–61.
The Society of Video Information Media, vol. 51, No. 12 (1997), 3–2, "Motion Compensation and Predictive Coding".
The Television Society, vol. 49, No. 4 (1995), 3–2–3, "Motion Compensated Predictive Coding".

* cited by examiner

*Primary Examiner*—Andy Rao
(74) *Attorney, Agent, or Firm*—Parkhurst & Wendel, L.L.P.

(57) ABSTRACT

An image predictive decoding method in which when compressively coded image data including information about a plurality of motion compensation modes, and a plurality of motion vectors corresponding to the plurality of motion compensation modes is decoded, for a target region to be decoded, target predictive region data calculated based on the motion vector of the target region, and adjacent predictive region data calculated based on the motion vector of at least one adjacent region to the target region, are weightedly averaged to produce optimal predictive region data to the target region, wherein the optimal predictive region data is produced using only the motion vector of the adjacent region having the same motion compensation mode as that of the target region. Thereby, when overlapped motion compensation is performed to an interlaced image, a highly efficient predictive signal is generated, and a coding efficiency is improved.

12 Claims, 14 Drawing Sheets

Fig.3
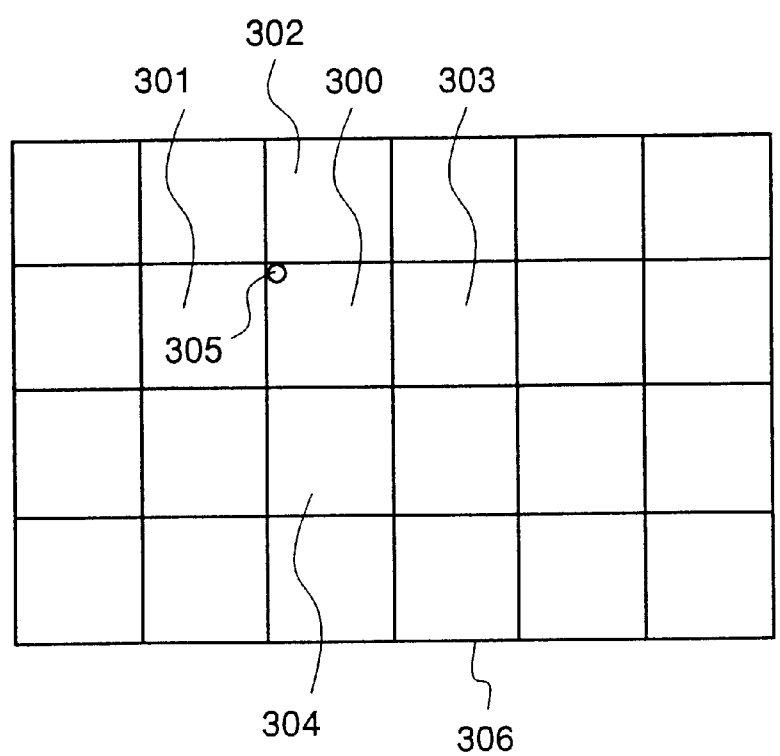
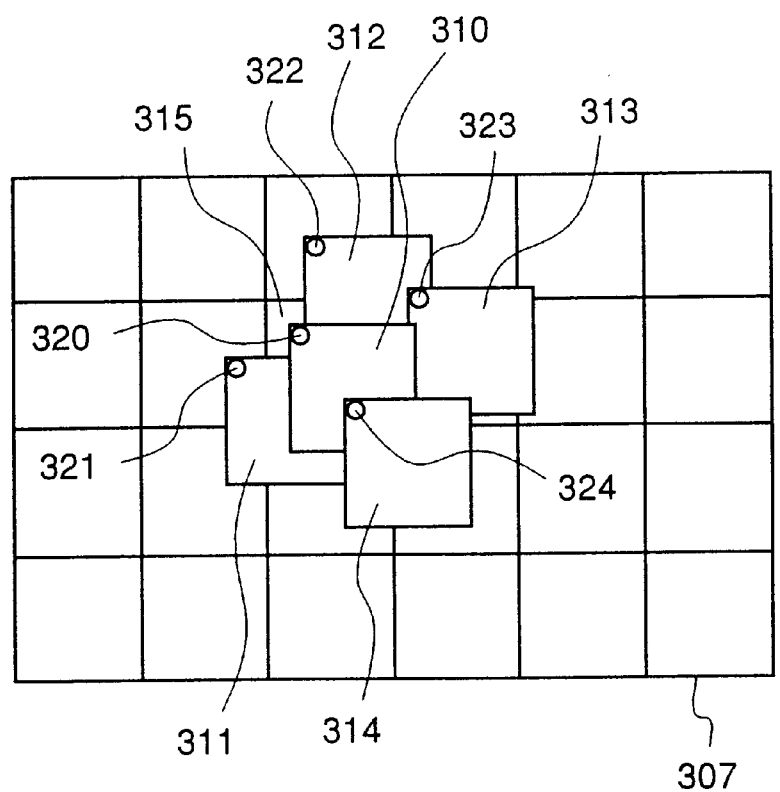

Fig.4
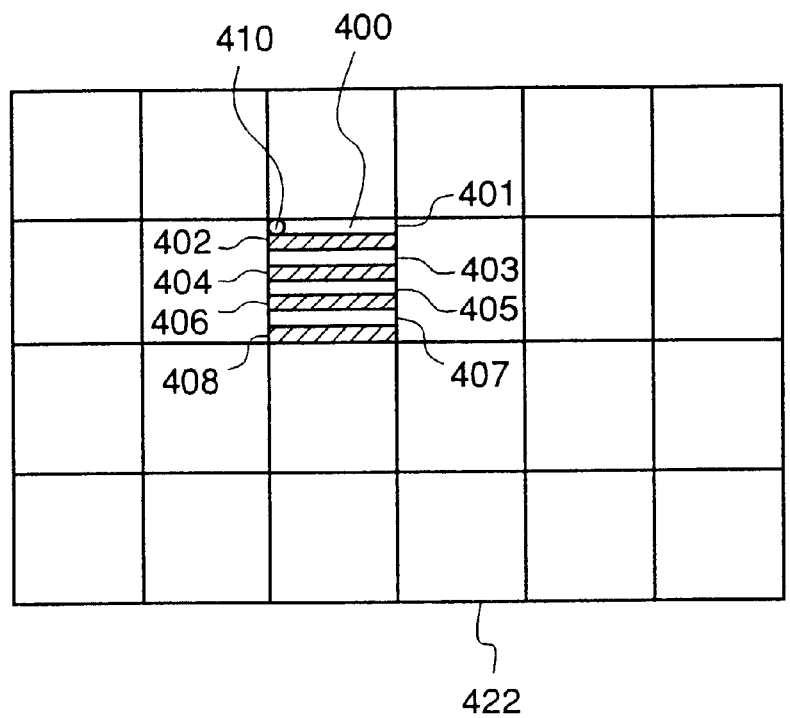
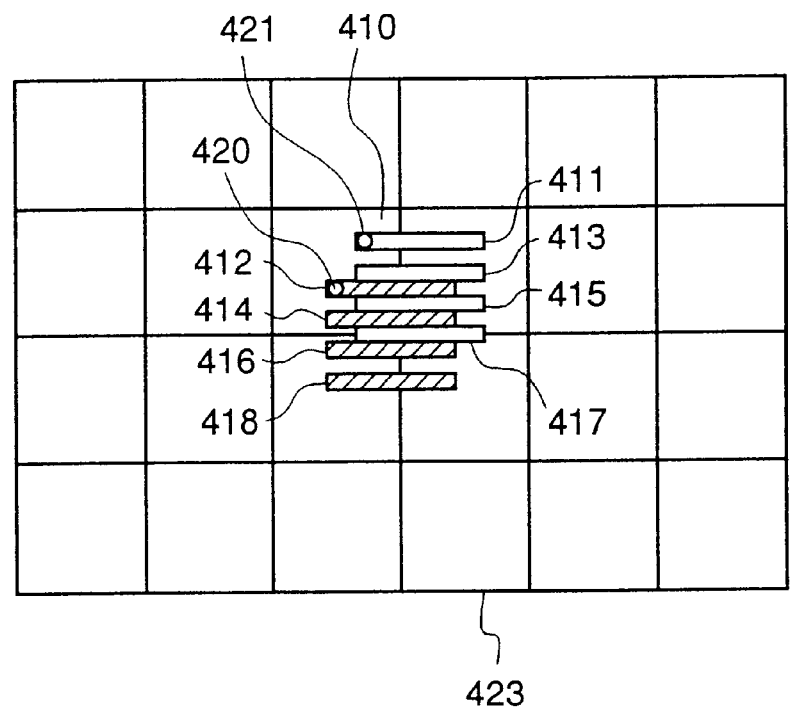

Fig.7
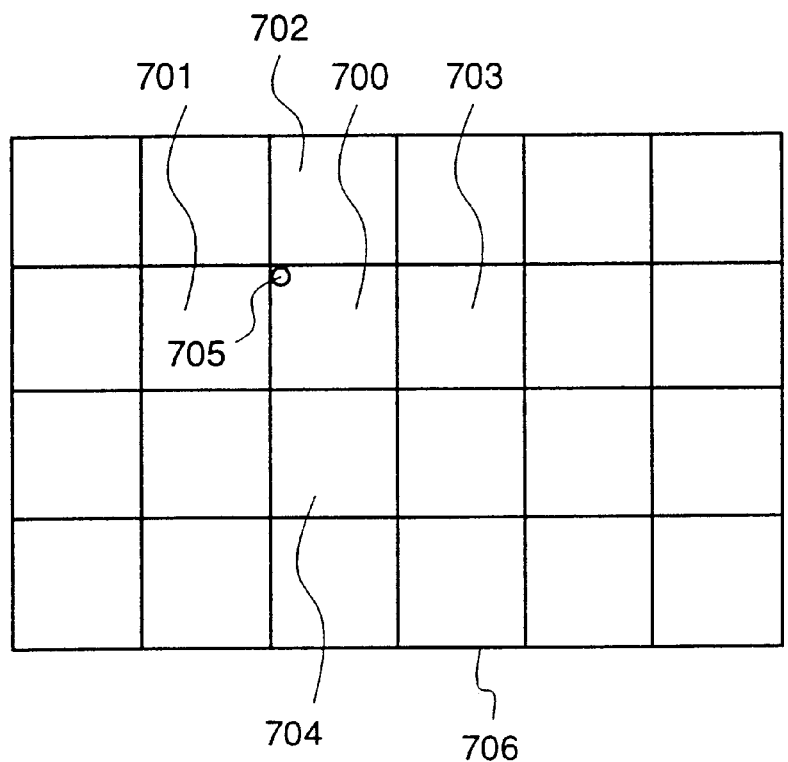
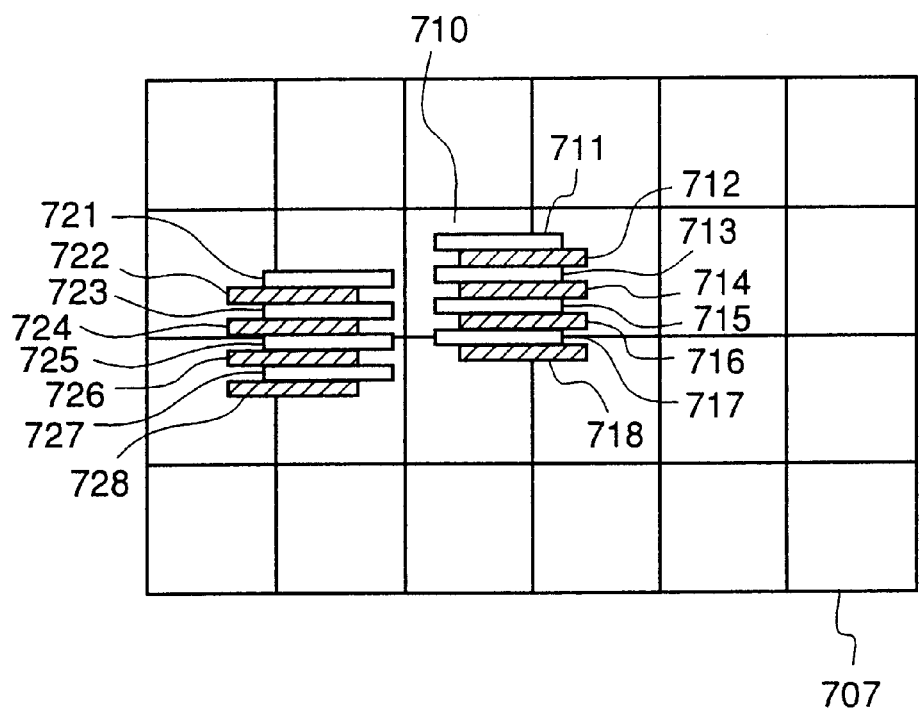

IMAGE PREDICTIVE DECODING METHOD, IMAGE PREDICTIVE DECODING APPARATUS, IMAGE PREDICTIVE CODING APPARATUS, AND DATA STORAGE MEDIUM

FIELD OF THE INVENTION

The present invention relates to an image predictive decoding method of predictively decoding a compressed digital image and, more particularly, to an overlapped compensation method for interlaced images, an apparatus for performing the method, and a data storage medium for storing the method.

BACKGROUND OF THE INVENTION

Compressive coding is required to store and transmit a digital image efficiently. There have been proposed methods of compressively coding a digital image, such as DCT (Discrete Cosine Transform) represented by JPEG and MPEG, and waveform coding, i.e., sub-band coding, wavelet coding, and fractal coding. Further, in order to remove redundant signals between images, inter-image prediction using motion compensation is performed, and a difference signal is subjected to waveform coding.

MPEG, which is based on motion compensation DCT, will be described.

An input image to be processed is divided into a plurality of 16×16 macroblocks. Each 16×16 macroblock is further divided into 8×8 blocks. Each 8×8 block is subjected to DCT. The resulting transform coefficients are quantized and then, transmitted or stored. This is called intra-frame coding.

On the other hand, using a method of detecting motion, such as block-matching which matches blocks, a predictive macroblock, which has the least error to a target macroblock of a frame, is detected among macroblocks of another frame temporally adjacent to the former frame. Motion is also detected. An optimal predictive block is obtained by subjecting a previous image to motion compensation based on the detected motion. A signal indicating a predictive macroblock having the least error is a motion vector. An image to be referred for generating a predictive macroblock is a reference image.

Next, a difference between a target block among the 8×8 blocks into which the input image is divided, and its corresponding predictive block, is calculated. The difference is subjected to DCT, its transform coefficients are quantized, and the result is transmitted or stored along with motion information. This is inter-frame coding. At the receiver, the difference signal is restored from the quantized transform coefficients. Thereafter, a predictive block corresponding to the target block is calculated based on the motion vector transmitted or stored. The predictive block is added with the difference signal to reproduce the image.

MPEG2 has two motion compensation modes for an interlaced image, i.e., a frame motion compensation mode and a field motion compensation mode. In the frame motion compensation, the data of an odd-numbered field and an even-number field of a block to be decoded are calculated based on the same motion vector. In the field motion compensation mode, the data of an odd-numbered field and an even-number field are obtained from two different motion vectors. In interlaced scanning, an odd-number field and an even-numbered field are scanned at different moments, so there is sometimes a large difference in the amount of motion between both of the fields. For this reason, when such an interlaced image is subjected to motion compensation, if an odd-numbered field and an even-number field are subjected to different motion compensation, the error of a predictive signal is made small, and resolution in the temporal region can be maintained.

On the other hand, according to the standard H.263 established by ITU-T, as to motion compensation in decoding an image, a predictive block is generated in a way in which in addition to a motion vector of a target block to be decoded, motion vectors of blocks adjacent to the target block are used to produce predictive data, and the weighted average of the predicted data is calculated, which is a predictive block. This is called overlapped motion compensation. By the overlapped motion compensation, errors of a predictive signal to a target block and the predictive signals to all adjacent blocks are averaged, thereby suppressing the difference signal, and reducing distortion between blocks, i.e., a phenomenon where the border between two blocks is clearly perceivable, as observed in cases where motion compensation is performed block by block.

When the overlapped motion compensation is applied to an interlaced image, the error of a predictive signal is required to be small. However, the interlaced image is processed with the frame motion compensation mode and the field motion compensation mode, so that there is a case where to adjacent blocks are subjected to motion compensation with different modes. The frame motion compensation mode is effective for a static region in which a high-frequency component between scanning lines is small. The field motion compensation mode is suitable for a region having a large motion in which a high-frequency component between scanning lines is large. When a target block is processed with the frame motion compensation mode while the adjacent block is processed with the field motion compensation mode, because the predictive data calculated based on the motion vector of the adjacent block has a large high-frequency component between scanning lines, the overlapped motion compensation introduces a high-frequency component to the predictive signal of the target block. As opposed to this, when a target block is processed with the field motion compensation mode while the adjacent block is processed with the frame motion compensation mode, the averaging in the overlapped motion compensation reduces the temporal resolution of a predictive signal, thereby blurring a motion in the region having a large motion.

SUMMARY OF THE INVENTION

It is an object to provide an image predictive decoding method improving a coding efficiency by generating a highly efficient predictive signal when overlapped motion compensation is applied to an interlaced image, an apparatus for the method, and a data storage medium for the method.

Other objects and advantages of the present invention will become apparent from the detailed description desired hereinafter; it should be understood, however, that the detailed description and specific embodiment are desired by way of illustration only, since various changes and modifications within the scope of the invention will become apparent to those skilled in the art from this detailed description.

According to a first aspect of this invention, there is provided an image predictive decoding method including a decoding method in which when decoding compressively coded image data resulting from predicting the data of a predictive region to a target region, using information about a plurality of motion compensation modes, and a plurality of motion vectors corresponding to the plurality of motion compensation modes, and performing coding, for a target region to be decoded, target predictive region data calculated based on the motion vector of the target region, and adjacent predictive region data calculated based on the motion vector of at least one adjacent region to the target region, are weightedly averaged to produce optimal predictive region data to the target region, said image predictive decoding method calculating the adjacent predictive region data, which is calculated based on the motion vector of at least one adjacent region to the target region, based only on the motion vector of the adjacent region having the same motion compensation mode as the target region, to produce the optimal predictive region data.

Therefore, it is possible to suppress the error of a predictive signal by performing overlapped motion compensation to interlaced image while getting around the problems that the overlapped motion compensation introduces high-frequency components to a static region, and that the motion in a region having a large motion blurs due to a reduction in the temporal resolution of a predictive signal by averaging in the overlapped motion compensation.

According to a second aspect of this invention, there is provided an image predictive decoding method including a decoding method in which when decoding compressively coded image data including information about a plurality of motion compensation modes, and a plurality of motion vectors corresponding to the plurality of motion compensation modes, for a target region to be decoded, target predictive region data calculated based on the motion vector of the target region, and adjacent predictive region data calculated based on the motion vector of at least one adjacent region to the target region, are weightedly averaged to produce optimal predictive region data to the target region, said image predictive decoding method calculating the adjacent predictive region data, which is calculated based on the motion vector of at least one adjacent region to the target region, based on the motion vector of the adjacent region when the adjacent region has the same motion compensation as the target region, or based on the motion vector of the target region when the adjacent region has a motion compensation mode different from that of the target region, to produce the optimal predictive region data.

Therefore, it is possible to suppress the error of a predictive signal by performing overlapped motion compensation to interlaced image while getting around the problems that the overlapped motion compensation introduces high-frequency components to a static region, and that the motion in a region having a large motion blurs due to a reduction in the temporal resolution of a predictive signal by averaging in the overlapped motion compensation.

According to a third aspect of this invention, there is provided the image predictive decoding method of any of the first and second aspects includes, as the motion compensation mode, a frame motion compensation mode in which the data of the even-numbered field and odd-numbered field of a predictive region are calculated based on the same motion vector, and a field motion compensation mode in which the data of the even-numbered field of a predictive region is calculated based on a first field motion vector, and the data of the odd-numbered field of the predictive region is calculated based on a second field motion vector.

Therefore, the same effect as in the first and second aspects are obtained.

According to a fourth aspect of this invention, there is provided an image predictive decoding method including a decoding method in which when decoding compressively coded image data resulting from predicting predictive region data to a target region, using information about a frame motion compensation mode in which the data of the even-numbered field and odd-numbered field of the predictive region are calculated based on the same motion vector, information about a field motion compensation mode in which the data of the even-numbered field of the predictive region is calculated based on a first field motion vector, and the data of the odd-numbered field of the predictive region are calculated based on a second field motion vector, and motion vectors corresponding to the plurality of motion compensation modes, and performing coding, for a target region to be decoded, target predictive region data calculated based on the motion vector of the target region, and adjacent predictive region data calculated based on the motion vector of at least one adjacent region to the target region, and weightedly averaged to produce optimal predictive region data to the target region.

said image predictive decoding method, when both a target region and the adjacent region are in the field motion compensation mode, calculating the data of an odd-numbered field of target predictive region based on the motion vector of the target region, the data of an even-numbered field of target predictive region based on the motion vector of the target region, the data of a first odd-numbered field of predictive region based on the motion vector of the adjacent region, the data of an even-numbered field of predictive region based on the motion vector of the adjacent region, weightedly averaging the data of an odd-numbered field of target predictive region and the data of a first odd-numbered field of predictive region, and the data of an even-numbered field of target predictive region and the data of a first even-numbered field of predictive region, to produce averaged odd-numbered field data and averaged even-numbered field data, respectively, and arranging the averaged odd-numbered field data and the averaged even-numbered field data in a frame structure, to produce optimal predictive region data.

Therefore, it is possible to suppress the error of a predictive signal by performing overlapped motion compensation to interlaced image when a target region and the adjacent region are in the same field predictive mode, while getting around the problems that the overlapped motion compensation introduces high-frequency components to a static region, and that the motion in a region having a large motion blurs due to a reduction in the temporal resolution of a predictive signal by averaging in the overlapped motion compensation.

According to a fifth aspect of this invention, there is provided an image predictive decoding method including a decoding method in which when decoding compressively coded image data resulting from predicting predictive region data to a target region, using information about a frame motion compensation mode in which the data of the even-numbered field and odd-numbered field of the predictive region are calculated based on the same motion vector, information about a field motion compensation mode in which the data of the even-numbered field of the predictive region is calculated based on a first field motion vector, and the data of the odd-numbered field of the predictive region is calculated based on a second field motion vector, and motion vectors corresponding to the plurality of motion compensation modes, and performing coding, for a target region to be decoded, target predictive region data calculated based on the motion vector of the target region, and adjacent predictive region data calculated based on the motion vector of at least one adjacent region to the target region, are weightedly averaged to produce optimal predictive region data to the target region.

Said image predictive decoding method, when the target region is in the frame motion compensation mode while the adjacent region is in the field motion compensation, calculating the adjacent predictive region data, which is calculated based on the motion vector of at least one adjacent region to the target region, based on an averaged frame motion vector of the adjacent region resulting from averaging the first field motion vector of the adjacent region and the second field motion vector of the adjacent region.

Therefore, even when a region in the frame motion compensation mode and a region in the field motion compensation mode are adjacent to each other, it is possible to suppress the error of a predictive signal by adaptively changing methods of overlapping, depending on the motion compensation mode of the target region, without introducing high-frequency components to a region in the frame predictive mode, and reducing the temporal resolution of a region in the field predictive mode. Further, it is possible to suppress the error of a predictive signal by performing overlapped motion compensation to interlaced image while getting around the problems that the overlapped motion compensation introduces high-frequency components to a static region, and that the motion in a region having a large motion blurs due to a reduction in the temporal resolution of a predictive signal by averaging in the overlapped motion compensation.

According to a sixth aspect of this invention, there is provided an image predictive decoding method including a decoding method in which when decoding compressively coded image data resulting from predicting predictive region data to a target region, using information about a frame motion compensation mode in which the data of the even-numbered field and odd-numbered field of the predictive region are calculated based on the same motion vector, information about a field motion compensation mode in which the data of the even numbered field of the predictive region is calculated based on a first field motion vector, and the data of the odd-numbered field of the predictive region is calculated based on a second field motion vector, and motion vectors corresponding to the plurality of motion compensation modes, and coding the predictive region data, for a target region to be decoded, target predictive region data calculated based on the motion vector of the target region, and adjacent predictive region data calculated based on the motion vector of at least one adjacent region to the target region, are weightedly averaged to produce optimal predictive region data to the target region.

said image predictive decoding method, when the target region is in the frame motion compensation mode while the adjacent region is in the field motion compensation, calculating the adjacent predictive region data, which is calculated based on the motion vector of at least one adjacent region to the target region, based on one of the first field motion vector of the adjacent region and the second field motion vector of the adjacent region, which has the smaller difference from the motion vector of the target region.

Therefore, even when a region in the frame motion compensation mode and a region in the field motion compensation mode are adjacent to each other, it is possible to suppress the error of a predictive signal by adaptively changing methods of overlapping, depending on the motion compensation mode of the target region, without introducing high-frequency components to a region in the frame predictive mode, and reducing the temporal resolution of a region in the field predictive mode. Further, when a target block is in the frame predictive mode while the adjacent region is in the field predictive mode, it is possible to suppress the error of a predictive signal by using the field motion vector of the adjacent block close to the frame motion vector of the target block, while getting around the problems that the overlapped motion compensation introduces high-frequency components to a static region, and that the motion in a region having a large motion blurs due to a reduction in the temporal resolution of a predictive signal by averaging in the overlapped motion compensation.

According to a seventh aspect of this invention, there is provided an image predictive decoding method including a decoding method in which when decoding compressively coded image data resulting from predicting predictive region data to a target region, using information about a frame motion compensation mode in which the data of the even-numbered field and odd-numbered field of the predictive region are calculated based on the same motion vector, information about a field motion compensation mode in which the predictive data of the even-numbered field of the predictive region is calculated based on a first field motion vector, and the predictive data of the odd-numbered field of the predictive region is calculated based on a second field motion vector, and motion vectors corresponding to the plurality of motion compensation modes, and performing coding, for a target region to be decoded, target predictive region data calculated based on the motion vector of the target region, and adjacent predictive region data calculated based on the motion vector of at least one adjacent region to the target region, are weightedly averaged to produce optimal predictive region data to the target region.

said image predictive decoding method, when the target region is in the field motion compensation mode while the adjacent region is in the frame motion compensation calculating a second field motion vector of the adjacent region, based on a first field motion vector of the target region, a second field motion vector of the target region, and a first field motion vector of the adjacent region equal to the frame motion vector of the adjacent region in assuming that the adjacent region has the information about a field motion compensation mode in which the predictive data of the even-numbered field of the predictive region are calculated based on a first field motion vector, and the predictive data of the odd-numbered field of the predictive region are calculated based on a second field motion vector, and producing the adjacent predictive region data using the first- and second field motion vectors of the adjacent region.

Therefore, even when a target region and the adjacent region are in the different predictive modes, it is possible to suppress the error of a predictive signal by performing overlapped motion compensation to interlaced image while getting around the problems that the overlapped motion compensation introduces high-frequency components to a static region, and that the motion in a region having a large motion blurs due to a reduction in the temporal resolution of a predictive signal by averaging in the overlapped motion compensation.

According to an eighth aspect of this invention, there is provided an image predictive decoding method including a decoding method in which when decoding compressively coded image data resulting from predicting the data of a predictive region to a target region, using information about a plurality of motion compensation modes, and a plurality of motion vectors corresponding to the plurality of motion compensation modes, and performing coding for a target region to be decoded, target predictive region data calculated based on the motion vector of the target region, and adjacent predictive region data calculated based on the motion vector of at least one adjacent region to the target region, are weightedly averaged to produce optimal predictive region data to the target region, said image predictive decoding method calculating the adjacent predictive region data, when the target region is in the frame motion compensation mode, weightedly averaging the target predictive region data and the adjacent predictive region data, to produce the optimal predictive region data to the target region, while when the target region is in the field motion compensation mode, the optimal predictive region data to the target region is calculated based only on the motion vector of the target region.

Therefore, it is possible to suppress the error of a predictive signal to performing overlapped motion compensation to interlaced image while getting around the problems that the overlapped motion compensation introduces high-frequency components to a static region, and that the motion in a region having a large motion blurs due to a reduction in the temporal resolution of a predictive signal by averaging in the overlapped motion compensation.

According to a ninth aspect of this invention, there is provided the image predictive decoding method of the eighth aspect wherein when the target region is in the frame motion compensation mode, optimal predictive region data to the target region is calculated in a way in which it is decided whether each adjacent region to the target region is in the field motion compensation mode, or not, and when the adjacent region is in the field motion compensation mode, the first and second motion vectors of the adjacent region are averaged, predictive region data to the adjacent region is calculated based on the averaged field motion vector of the adjacent region, and the target predictive region data and all of the adjacent predictive region data are averaged to produce the optimal predictive data to the target region.

Therefore, the same effect as in the eighth aspect is obtained.

According to a tenth aspect of this invention, there is provided an image predictive decoding apparatus comprising:

a frame memory;

an input unit for receiving compressively coded image data including information about a plurality of motion compensation modes, and a plurality of motion vectors corresponding to the plurality of motion compensation modes;

a data analyzer for analyzing the compressively coded image data, and outputting at least the information about the plurality of motion compensation modes, the plurality of motion vectors corresponding to the plurality of motion compensation modes, and image transform coefficients;

a decoder for restoring the image transform coefficients with a prescribed method to a decompressed difference image;

a predictive image generator for generating an optimal predictive image based on a reference image stored said frame memory; and an adder for adding the decompressed difference image and the optimal predictive image to produce a reproduced image, outputting the same, and storing the same in said frame memory, said predictive image generator producing optimal predictive region data using the image predictive decoding method of any of the first aspect to the ninth aspect.

Therefore, it is possible to provide an apparatus realizing an image predictive decoding method which gets around the problems that the overlapped motion compensation introduces high-frequency components to a static region, and that the motion in a region having a large motion blurs due to a reduction in the temporal resolution of a predictive signal by averaging in the overlapped motion compensation.

According to an eleventh aspect of this invention, there is provided an image predictive coding apparatus comprising:

a frame memory;

an output unit;

an input unit for receiving a digital image signal of each frame;

a predictive data generator for generating the data of a predictive block based on a reference image stored in said frame memory;

a first adder for outputting difference data between the data of a target block and the data of the predictive block, as the data of a residual block;

an encoder for compressing the data of the residual block, and outputting the compressed data of the residual block;

a variable length encoder for subjecting the compressed data of the residual block to variable length coding, and outputting the resulting coded signal through said output unit;

a decoder for decompressing the compressed data of the residual block, and outputting the decompressed data of the residual block; and a second adder for adding the decompressed data of the residual block to the data of the predictive block, outputting the data of a resulting reproduced block, and storing the data of the reproduced block in said frame memory;

said predictive data generator performing predictive data production corresponding to the optimal predictive region data production in the image predictive decoding method of any of the first aspect to the ninth aspect.

Therefore, it is possible to provide an apparatus performing encoding for an image predicting decoding method which gets around the problems that the overlapped motion compensation introduces high-frequency components to a static region, and that the motion in a region having a large motion blurs due to a reduction in the temporal resolution of a predictive signal by averaging in the overlapped motion compensation.

According to a twelfth aspect of this invention, there is provided a data storage medium storing a program for performing the image predictive decoding method of any of the first to ninth aspects, using a computer.

Therefore, it is possible to provide a storage medium containing a program executing an image predictive decoding method which gets around the problems that overlapped motion compensation introduces high-frequency components to a static region, and that the motion in a region having a large motion blurs due to a reduction in the temporal resolution of a predictive signal by averaging in the overlapped motion compensation.

BRIEF DESCRIPTION OF THE DRAWINGS

FIG. 3 is a schematic diagram for explaining overlapped motion compensation used in the method of generating an predictive image according to the first embodiment.

FIG. 4 is a schematic diagram for describing field motion compensation used in the method of generating a predictive image in the image predictive decoding method of the first embodiment.

FIG. 7 is a schematic diagram for explaining overlapped motion compensation for fields used in the method of generating an predictive image according to the third embodiment.

DETAILED DESCRIPTION OF THE PREFERRED EMBODIMENTS

Embodiments of the present invention will be described with reference to FIG. 1 to FIG. 14.

Embodiment 1

Figure 1:
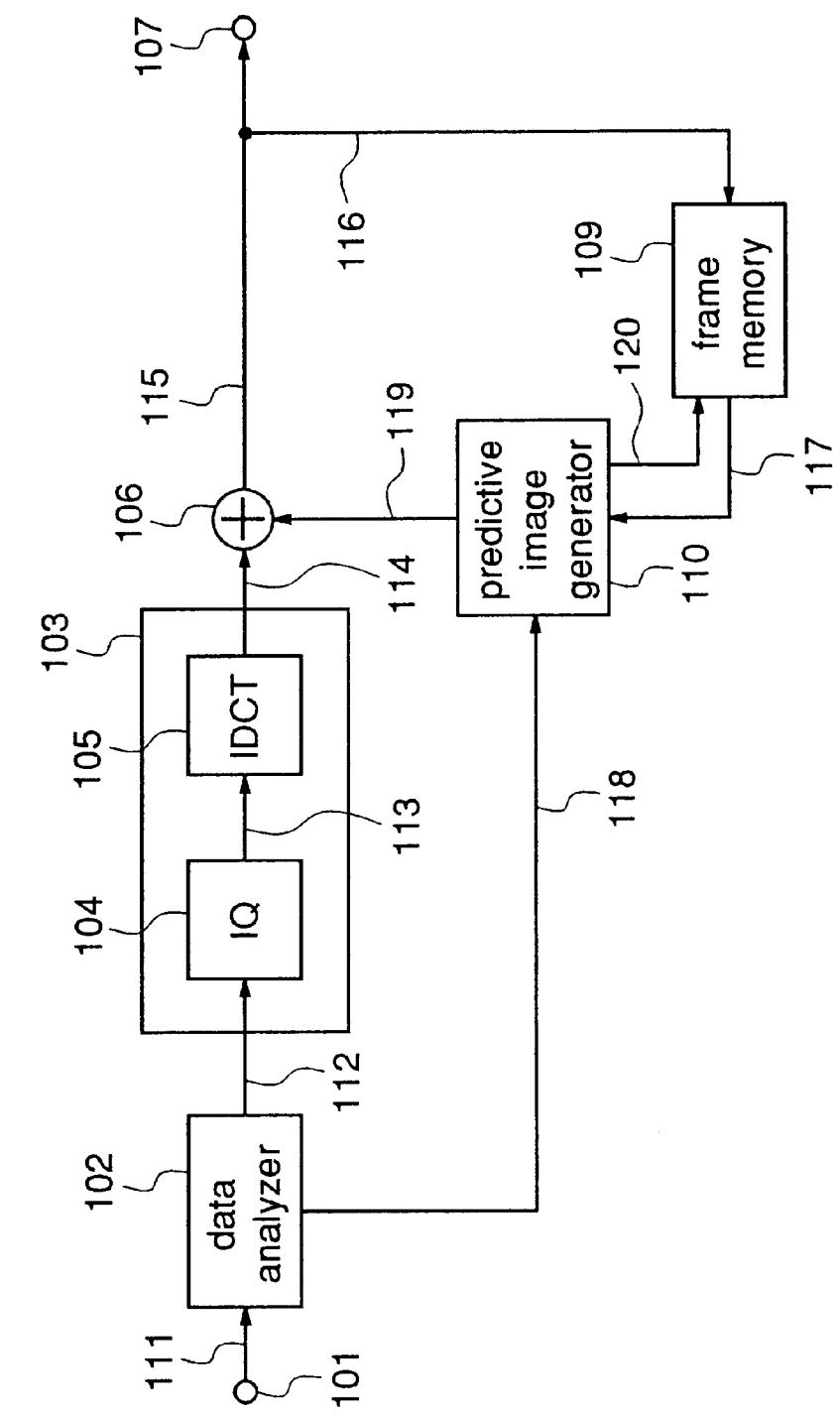
FIG. 1 is a block diagram showing an image predictive decoding apparatus in accordance with embodiments of this invention.

FIG. 1 is a block diagram or an image predictive decoding apparatus according to a first embodiment of this invention.

In the image predictive decoding method of the first embodiment, which corresponds to claim 1, overlapped motion compensation is carried out by calculating predictive region data based on the motion vectors of only adjacent regions having the same motion compensation mode as a target region. That is, the overlapped motion compensation is performed in the following way. First predictive region data, which are the predictive region data to adjacent regions, are calculated by using the motion vectors of only adjacent regions having the same motion compensation mode as a target region. The first predictive region data, and the target predictive region data calculated based on the motion vector of the target region, are averaged to obtain optimal predictive region data.

In FIG. 1, reference numeral 101 denotes an input terminal into which compressively coded data is input; 102, a data analyzer analyzing data input through the input terminal 101 via a line 111; 103, a transformation decoder subjecting the analyzed data to transformation decoding, comprising an inverse quantizer 104, or IQ for short, and an inverse discrete cosine transformer 105, or IDCT for short; 110, a predictive image generator generating a predictive image using information about a motion compensation mode, and a motion vector, from the data analyzer 102 via a line 118; 106, an adder adding an output of the IDCT 105 via a line 114, and a predictive image signal from the predictive image generator 110 via a line 119; 107, an output terminal through which an output of the adder 106 is output via a line 115; and 109, a frame memory to which an output of the adder 106 is input via the line 115 and, further, a line 116.

As to the thus-constructed image predictive decoding apparatus in accordance with the first embodiment, the operation will be explained.

Compressively coded data is input through the input terminal 101. In compressively coding data, an image is divided into a plurality of small regions, each small region is subjected to DCT to transform it to the frequency region. Although the small region into which the image is divided is a block constituted by 8×8 elements, the way of division is not necessarily restricted to this. Transition coefficients resulting from performance of DCT are subjected to quantization with a predetermined size of quantization step. Further, a result of the quantization is subjected to variable length coding. By exploiting a correlation between frames, the data of a predictive region is calculated by motion compensation using a motion vector corresponding to the motion compensation mode minimizing a difference between the data of a target region and the data of the corresponding predictive region. A difference between the data of a target region to be coded, and the data of the predictive region, is transformed by DCT, and the result is quantized. The compressively coded data further includes the quantization step size, the transform coefficients resulting from the quantization, the motion vector of the motion compensation mode minimizing the difference, and the information about motion compensation modes. For the motion compensation mode, there are the frame motion compensation mode and the field motion compensation mode used in MPEG2, and the overlapped motion compensation mode used in H.263. The above description is for the coding side.

The data input through the input terminal 101 is analyzed in the data analyzer 102. The quantization step and the quantized transform coefficients are transmitted via the line 112 to the transformation decoder 103, while the information about motion compensation modes, and the motion vector are output to the predictive image generator 110 via the line 118. The transformation decoder 103 decompresses the quantized transform coefficients to restore the difference data decompressed. In the first embodiment, the transform coefficients quantized using a quantization step are inversely quantized by the inverse quantizer 104, and then, the transform coefficients in the frequency region are transformed to spatial region signals by the IDCT 105.

The predictive image generator 110 generates an address 120 for accessing the frame memory 109 based on the motion vector corresponding to information about a motion compensation mode, and generates a predictive block based on an image stored in the frame memory 109, input via the line 117.

The predictive block generated the predictive image generator 110 and the difference block decompressed by the IDCT 105 are input to the adder 106 via the line 119 and 114, respectively. The addition produces a reproduced block to be output via the line 115. The thus-reproduced image is stored in the frame memory via the line 116 while it is output through the output terminal 107. Thereafter, although it is not shown in FIG. 1, a display is connected to the output terminal 107, which presents the image, or an image processing circuit is connected to the output terminal 107, which processes the image.

The operation of the predictive image generator 110 will be described.

In generating an predictive image, the information about motion compensation modes, and the corresponding motion vector are used. As to the motion compensation mode, as described above, the first embodiment has three modes, i.e., the frame motion compensation mode, the field compensation mode, and the overlapped motion compensation mode. In the frame motion compensation mode, the data of the odd-numbered field and even-numbered field of a target block to be decoded are calculated using the same vector. That is, the value of each coordinate point of the target block is added with the same motion vector, no matter whether the coordinate point is on an odd-numbered field or even-numbered field, thereby producing an address for the value of each predictive coordinate point stored in the frame memory 109.

In the field motion compensation mode, predictive values of the odd-numbered field and even-numbered field of a target block are calculated using two different motion vectors. That is, the value of each coordinate point on the odd-numbered field of the target block is added with the value of the odd-numbered field motion vector, while the value of each coordinate point on the even-numbered field of the target block is added with the value of an even-numbered field motion vector. Thus, the address of predictive value stored in the frame memory 109, to the value of each coordinate point on the target block, is generated.

FIG. 4 is a schematic diagram for explaining the field motion compensation mode. An image 422 is a target image to be decoded. An image 423 is a reference image to be referred for generating a predictive signal. A block 400 is a target block to be reproduced. Predictive values of picture elements on lines 401 to 408 are to be calculated. MV0_f1 and MV0_f2 represent motion vectors of the odd-numbered field and the even-numbered field, respectively. The coordinate values of the picture elements on the lines 401, 403, 405, and 407 are added with MV0_f1, while the coordinate values of the picture elements on the lines 402, 404, 406, and 408 are added with MV0_f2. The thus-calculated values are the coordinate values of the picture elements in the reference image 423. The predictive signals of the lines 401, 403, 405, and 407 are lines 411, 413, 415, and 147, respectively. The predictive signals of the lines 402, 404, 406, and 408 are lines 412, 414, 416, and 148, respectively.

FIG. 3 is a schematic diagram for describing the overlapped motion compensation mode. An image 306 is a target image to be decoded. An image 307 is a reference image to be referred for generating a predictive signal. A block 300 is a target block to be reproduced. The predictive value of each picture element of the block is to be calculated. Blocks 301, 302, 303, and 304 are adjacent to the block 300. In the prior art, overlapped motion compensation is applied only to the frame motion compensation mode. Hence, the frame motion compensation mode will be disclosed here.

MV0, MV1, MV2, MV3, and MV4 are motion vectors of a frame of blocks 300, 301, 302, 303, and 304, respectively. The coordinate value of a picture element 305 on the top left end of the target block 300 is added with each motion vector, and each result is regarded as the top left end of each 8×8 block in the reference image 307, thereby producing each predictive block. The predictive blocks resulting from adding the motion vectors MV0, MV1, MV2, MV3, and MV4 to the coordinate value of the picture element 305, are blocks 310, 311, 312, 313, and 314. The weighted average of each picture element of the blocks is the data of an optimal predictive block to the target block 300. In the first embodiment, the data calculated based on the motion vector MV0 of the target block is multiplied by a weight 4, while the data based on the motion vectors of the adjacent blocks are multiplied by a weight 1, and they are averaged by 8. Note that weights other than these values are possible. Rather than the entire blocks 311, 312, 313, and 314, part of them may be used for calculating the average; for example, half each adjacent block to the target block may be used for average. As to the adjacent block, although described is the case that four adjacent blocks are used for average, only left and top adjacent blocks may be used for average, or only a left adjacent block may be used for average, depending on situations.

Figure 2:
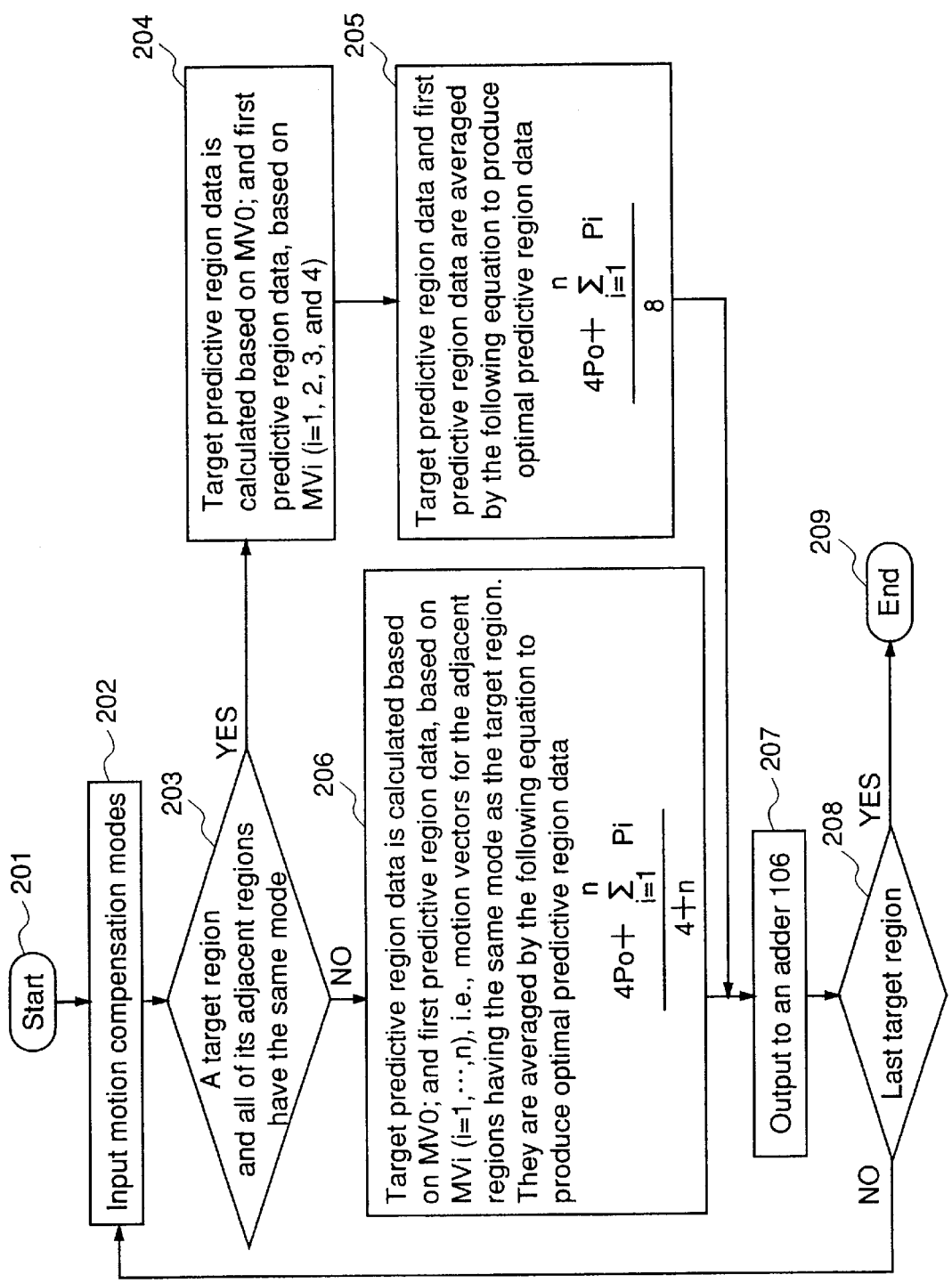
FIG. 2 is a flowchart showing a method of generating a predictive image in an image predictive decoding method in accordance with a first embodiment of this invention.

FIG. 2 is a flowchart of the method of generating a predictive image in the first embodiment. In step 202, information about motion compensation modes, i.e., information about a frame motion compensation mode or field motion compensation mode, of a target block to be decoded (hereinafter referred to as a target block), is input. In step 203, the mode of an adjacent region to be overlapped (hereinafter referred to as an adjacent block) is compared to that of the target block. For example, as shown in FIG. 10(a), when the motion compensation mode of the target region 1001 and the motion compensation modes of the adjacent regions 1002, 1003, 1004, and 1005 all are the same (in the figure, Fr : frame motion compensation mode, F1 : field motion compensated mode), in step 204 and the data of a predictive region to the target block is calculated based on the motion vector MV0 of the target block, while the data of a first predictive region are calculated based on the motion vectors MVi (i=1, 2, 3, and 4). Thereafter, in step 205 the target predictive region data represented by Po and the first predictive region data represented by Pi are averaged according to the following equation to generate optimal predictive region data P, $$P = \frac{4Po + \sum_{i=1}^{4} Pi}{8} \quad (1)$$

In step 203, for instance, as shown in FIG. 10(b), when the motion compensation node of the target region is different from any of the compensation modes of the adjacent region, in step 206 a target predictive region data is calculated based on the motion vector MV0 of the target block 1001, while a first predictive regions are calculated based on the motion vectors MVi of the adjacent regions, i.e., 1002 in FIG. 10(b), having the same mode as the target region (i=1, 2, . . . . , and n, where n is the number of the adjacent regions having the same mode as the target region; n=1 in case o FIG. 10(b)).

Thereafter, the data are averaged by the following equation to produce optimal predictive region data, $$P = \frac{4Po + \sum_{i=1}^{n} Pi}{4+n} \quad (2)$$

The above-calculated optimal predictive region data is output to the adder 106 in step 207. In step 208, it is decided whether a current target region is a last target region or not. Until the last target region, the process returns to step 202, and the above operation is repeated to produce optimal predictive region data.

In the first embodiment, in subjecting an interlaced image to overlapped motion compensation, the first predictive region, i.e., the predictive region data to the adjacent region, is calculated using only the motion vector of the adjacent region having the same motion compensation mode as the target region, and the first predictive region data and the target predictive region data calculated using the motion vector of the target region, are averaged to obtain optimal predictive region data. Blocks in a target region and the adjacent regions having the same motion compensation mode as the target region, that is, only blocks having the same frame motion compensation mode, or only blocks having the same field motion compensation mode, are overlapped and averaged. Thus, the overlapped motion compensation to the interlaced image does not introduce a high-frequency component to a static region, that is, it is not the case that because the target block is in the frame motion compensation mode while an adjacent block is in the field motion compensation mode, and a predictive data calculated based on the motion vector of the adjacent block has a high-frequency component between scanning lines, a high-frequency component is introduced to a predictive signal of a target block due to overlapped motion compensation. Further, the temporal resolution of a region having a large motion is not reduced, that is, it is not the case that because the target block is in the field motion compensation mode while an adjacent block is in the frame motion compensation mode, the average in the overlapped motion compensation reduces the temporal resolution of a predictive signal, and blurs the motion in the region having a large motion.

Embodiment 2

Figure 5:
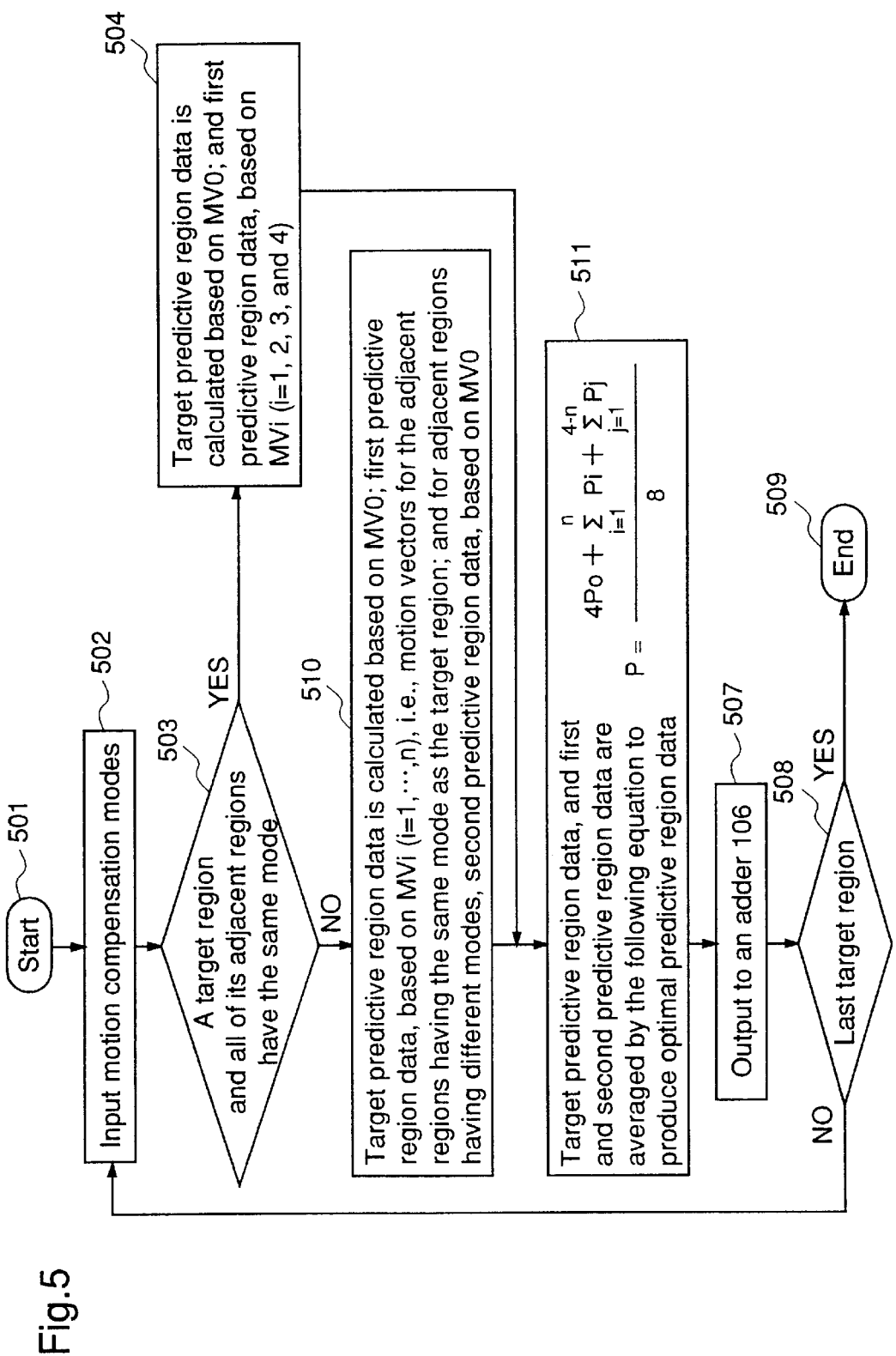
FIG. 5 is a flowchart showing a variation of a method of generating a predictive image in the image predictive decoding method of the first embodiment, according to a second embodiment.

FIG. 5 is a flowchart showing a method of generating a predictive image by an image predictive decoding method in accordance with a second embodiment which is a variation of the first embodiment.

In the image predictive decoding method of the second embodiment, which corresponds to claim 2, the overlapped motion compensation is performed in the following way. For adjacent regions having the same motion compensation mode as a target region, the predictive region data to the adjacent regions are calculated as first predictive region data, based on the motion vectors or the adjacent regions. For adjacent regions having a motion compensation mode different from that of a target region, the predictive region data to the adjacent regions are calculated as second predictive region data, based on the motion vectors of the target region. Thereafter, target predictive region data, and the first and second predictive regions, are averaged to obtain optimal predictive region data.

The flowchart of FIG. 5 is basically the same as that of FIG. 2, except for step 503 handling with a different mode. That is, when the motion compensation modes of all adjacent region are different from that of a target region, in step 510 a target predictive region data is calculated based on the motion vector MV0 of the target region, for example, the region 1001 in FIG. 10(b), while a first predictive region data are calculated based on the motion vectors MVi or adjacent regions having the same motion mode (Fr) as the target region (i=1, 2, . . . , and n, where n is the number of adjacent regions having the same mode as the target region), for example, the region 1002 in FIG. 10(b), and second predictive region data are calculated based on the motion vector MV0 of the target block as to adjacent regions having different modes (Fi), for example, the regions 1003, 1004, and 1005 in FIG. 10(b). Thereafter, in step 511, the target predictive region data represented by Po, and the first and second predictive region data represented by Pi and Pj, respectively, are averaged by the following equation to produce optimal predictive data, $$P = \frac{4Po + \sum_{i=1}^{n} Pi + \sum_{j=1}^{l \cdot n} Pj}{8}. \quad (3)$$

In the flow in FIG. 5 of the second embodiment, as is different from the flow in FIG. 2, either when the motion compensation modes are the same (in case of the flow through step 504) or different (in case of the flow through step 510), the process goes through the same step 511 for average. Hence, using the same equation for averaging makes the program more simple, compared with the first embodiment.

In the image predictive decoding method of the second embodiment, overlapped motion compensation is performed in the following way. For adjacent regions having the same motion compensation mode as a target region, first predictive region data are calculated based on the motion vectors of the adjacent regions. For adjacent regions having a motion compensation mode different from that of a target region, second predictive region data are calculated based on the motion vectors of the target region. Thereafter, target predictive region data, and the first and second predictive region are averaged to obtain optimal predictive region data.

In the second embodiment, just as in the first embodiment, when an interlaced image is subjected to overlapped motion compensation, blocks in a target region and the adjacent region both having the same motion compensation mode, i.e., only blocks of the frame motion compensation mode, or only blocks of the field motion compensation mode are overlapped and averaged, thereby, just as in the first embodiment, giving a solution to the problems that a high-frequency component is introduced to a static region, and that the temporal resolution of a region having a large motion is reduced.

Embodiment 3

Figure 6:
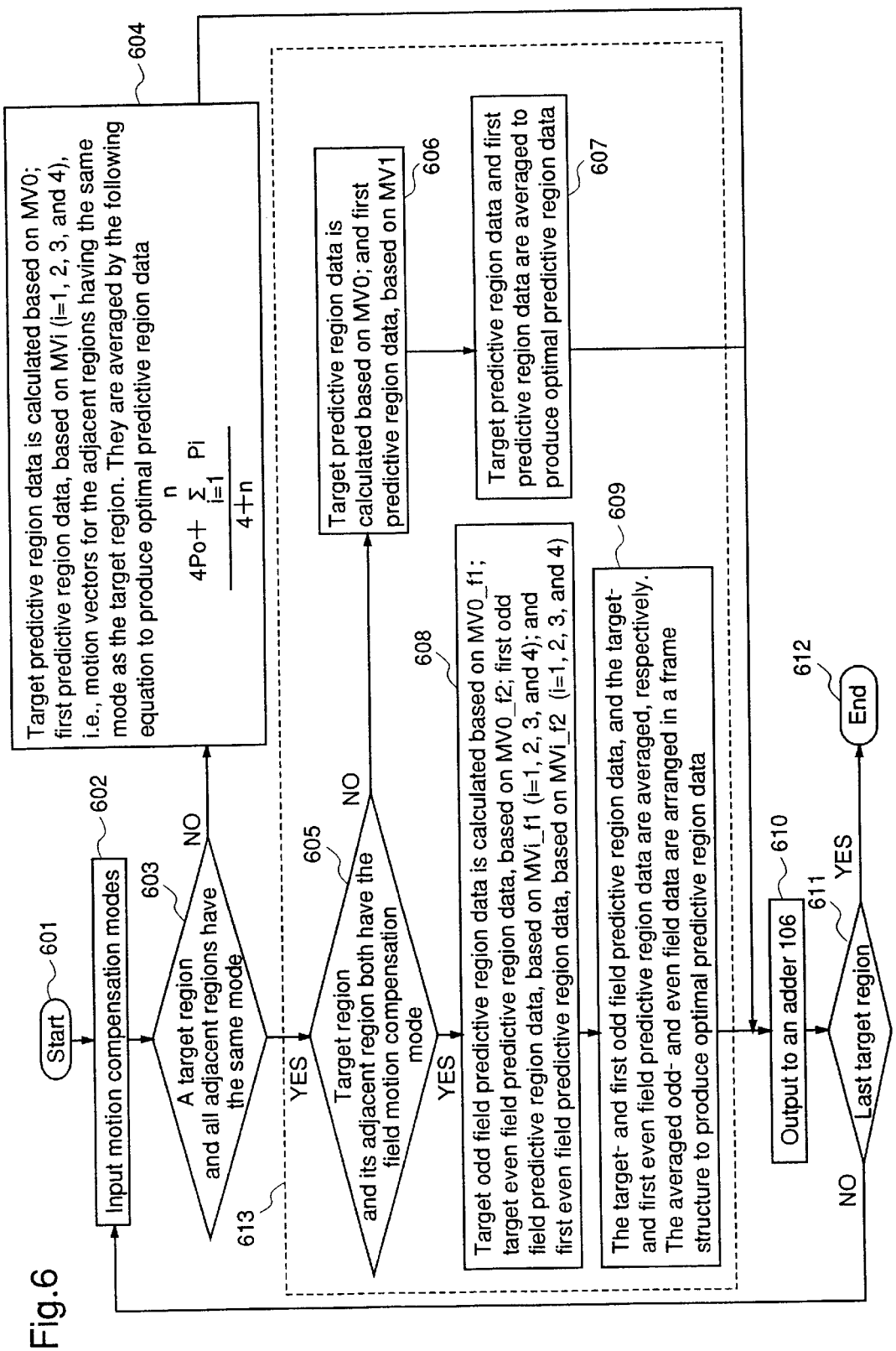
FIG. 6 is a flowchart showing a method of generating a predictive image in an image predicting decoding method according to a third embodiment of this invention.

FIG. 6 is a flowchart showing a method of generating a predictive image in an image predictive decoding method in accordance with a third embodiment.

In the third embodiment, which corresponds to claim 4, overlapped motion compensation is performed to a target region and adjacent regions when they both are in a field predictive mode.

Initially, in step 602, information about the motion compensation mode of a target block, i.e., the frame motion compensation mode or the field motion compensation mode, is input.

In step 603, the motion compensation modes of the target block and the adjacent blocks are compared with each other. When the motion compensation modes are different, i.e., all of the target region and the adjacent regions are not in the same motion compensation mode (NO as a result of step 603), in step 604 optimal predictive region data is generated by the same method as in step 206 of FIG. 2 or steps 510 and 511 of FIG. 5. Thereafter, the optimal predictive region data is output to the adder 106 in step 610.

When it is decided in step 603 that all the motion compensation modes are the same (YES as a result of step 603), in step 605 it is decided whether the target block and the adjacent blocks both are in the field predictive mode or not. If not, in step 606, target predictive region data is calculated based on the motion vector MV0 of the target block, and first predictive region is calculated based on the motion vector MV1 for the adjacent region.

Further, in step 607 the target predictive region data and the first predictive region data are averaged to produce optimal predictive region data.

When the target block and the adjacent blocks both are in the field predictive mode, in step 608, target odd field predictive region data is calculated based on the motion vector $MV0_{13}f1$ of the odd-numbered field of the target block; target even field predictive region data, based on the motion vector MV0_f2 of the even-numbered field of the target block; first odd field predictive region data (i) for each adjacent region, based on the motion vector MVi_f1 (i=1, 2, 3, and 4) of the odd-numbered field of the adjacent block; and first even field predictive region data (i) for each adjacent region, based on the motion vector MVi_f2 (i=1, 2, 3, and 4) of the even-numbered field of the adjacent block.

Thereafter, in step 609, as shown in FIG. 11(a), the target odd field predictive region data P1o and the first odd field predictive region data P2o to P5o are averaged according to the equation (1). Similarly, the target even field predictive region data P1e and the first even field predictive region data P2e to P5e are averaged according to the equation (1). The averaged odd and even field data Pmo and Pme are arranged in a frame structure as shown in FIG. 11(b) to generate optimal predictive region data to a target block 1101. The optimal predictive region data is, then, output to the adder 106 in step 610. In step 611, it is decided whether a current target block is the last one or not. Until the last target block, the process returns to step 602, the foregoing operation is repeated, and the optimal predictive region data is generated and output to the adder 106.

FIG. 7 is a schematic diagram for explaining the overlapped motion compensation performed to fields in steps 608 and 609.

In FIG. 7, reference numeral 706 denotes a target image; 701, 702, 703, and 704, adjacent blocks; and 707, a reference image for calculating predictive data. The target block 700 has the field predictive mode. Predictive data calculated based on the odd-numbered field motion vector and the even-number field motion vector are lines 711, 713, 715, and 717, and lines 712, 714, 716, and 718, respectively. The adjacent block 701 also has the field predictive mode. Predictive data calculated based on the odd-numbered motion vector and the even-number motion vector are lines 721, 723, 725, and 727, and lines 722, 724, 726, and 728, respectively. In averaging, the line 711, the line 721, and counterparts in the other adjacent blocks are averaged. Similarly, the line 712, the line 722, and counterparts in the other adjacent blocks are averaged. The line 713, the line 723, and counterparts in the other adjacent blocks are averaged. Thus, the picture elements of the same numbered fields are averaged.

Also in the third embodiment, when overlapped motion compensation is applied to an interlaced image, because blocks in the target region and adjacent regions having the field motion compensation mode are overlapped and averaged, that is, the overlapped motion compensation is thus carried out, there is provided a solution to the problems that a high-frequency component is introduced to a static region, and that the temporal resolution of a region having a large motion is reduced.

In the third embodiment, it is decided in step 603 whether all the motion compensation modes of a target block and adjacent blocks are the same or not. If not, in step 604, the same process as in step 206 of FIG. 2 is carried out. However, the same process as in steps 510 and 511 of FIG. 5 may be carried out.

Further, in the third embodiment, in step 603, when all the motion compensation modes of a target block and adjacent blocks are not the same, if the target region and some of the adjacent blocks have the same motion compensation mode, the process equivalent of steps 608 and 609 in FIG. 6 using the average by the equation (2) in step 206 of FIG. 2, or using the average of the target region data and the first and second predictive region data, in place of the target region data and the first predictive region data, by the equation (3) in steps 510 and 511 of FIG. 5, may be carried out to increase precision of the prediction.

Embodiment 4

Figure 8:
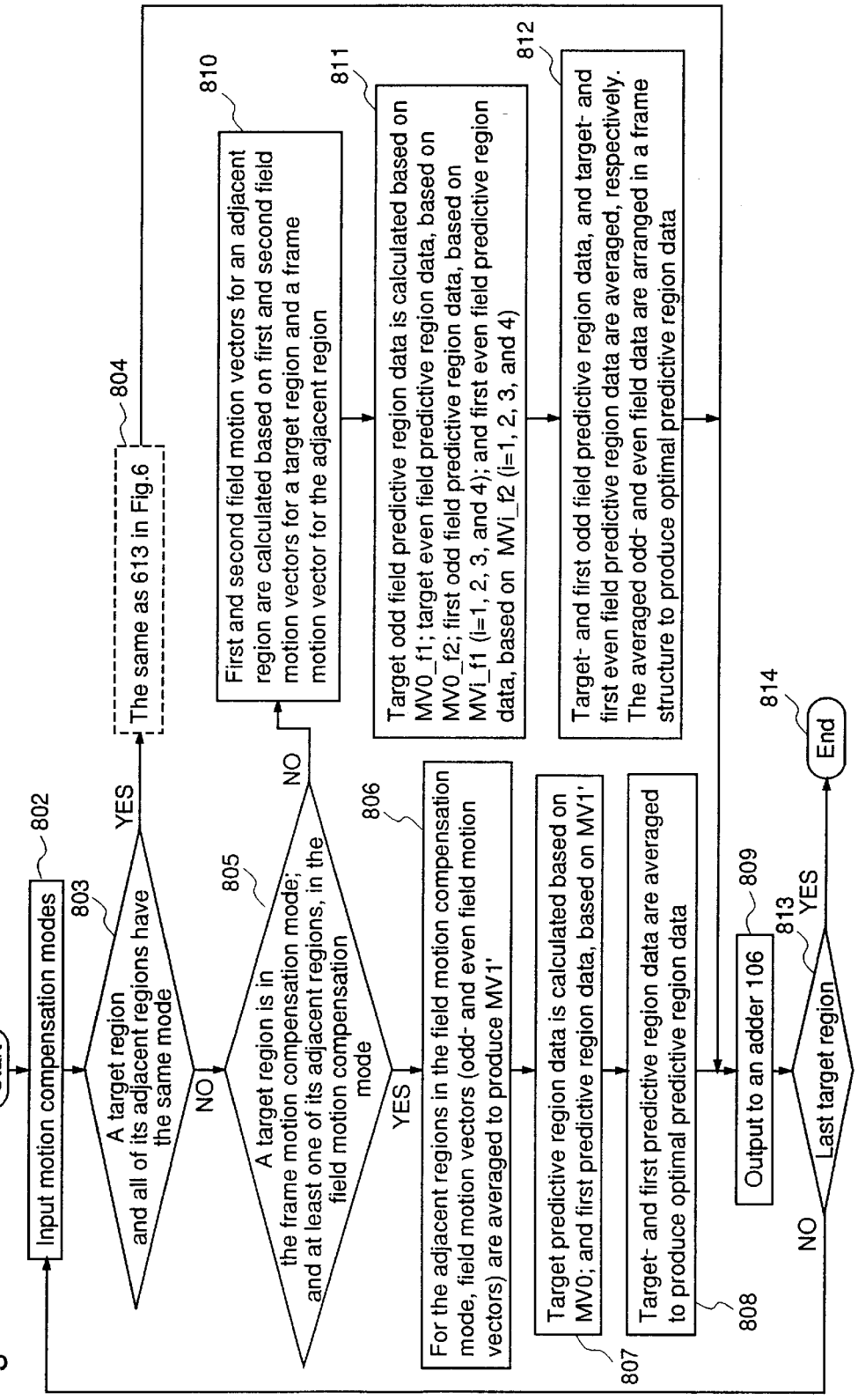
FIG. 8 is a flowchart showing a method of generating a predictive image in a image predictive decoding method in accordance with a fourth embodiment.

FIG. 8 is a flowchart showing a method of generating a predictive image in an image predictive decoding method in accordance with a fourth embodiment.

In the fourth embodiment, which corresponds to claim 5 and claim 7, overlapped motion compensation is performed to a target region and adjacent regions when they both are in different predictive modes.

Steps 802 and 803 are the same as steps 502 and 503 in the above-described second embodiment, and steps 602 and 603 in the third embodiment, respectively. When a target block and the adjacent block are in the same predictive mode, the process in step 604 in FIG. 6 described in the third embodiment is carried out in step 804. A description will be given of a case where a target block and the adjacent block are in different predictive modes.

In step 805, it is decided whether a target block and at least one of the adjacent blocks are in the frame predictive mode and in the field predictive mode, respectively. If they are, the process goes to step 806. In step 806, two field motion vectors, i.e., an odd-numbered field motion vector and an even-numbered field motion vector, are averaged to generate a frame motion vector MV1', to the adjacent regions in the field predictive mode. In step 807, target predictive region data is calculated based on the motion vector MV0 of the target block, while first predictive region data is calculated based on the averaged frame motion vector MV1' of the adjacent block. Thereafter, the target predictive region data and the first predictive region data are averaged to generate optimal predictive region data in step 808. The optimal predictive region data is output to the adder 106 in step 809.

When the decision in step 805 is negative, the target block is in the field predictive mode while the adjacent block is in the frame predictive mode. In step 810, first and second field motion vectors of the adjacent block are generated from the first and second field motion vectors of the target block (Mv0_f1 and MV0_f2), and the frame motion vector of the adjacent block (MV1). In the fourth embodiment, if the field motion vectors of the adjacent block is represented by MV1_f1 and MV1_f2, respectively, it is assumed that MV1_f1=MV1 is satisfied. So, according to the relation, MV1_f1-MV1_f2=MV0_f1-MV0_f2, MV1_f2 is calculated. Using the thus-calculated field motion vector, in step 811, target odd field predictive region data is calculated based on the MV0_f1; target even field predictive region data, based on the MV0_f2; first odd field predictive region data (i) for each adjacent region, based on the MVi_f1 (i=1, 2, 3, and 4); and first even field predictive region data (i) for each adjacent region, based on the MVi_f2 (i=1, 2, 3, and 4).

Figure 12:
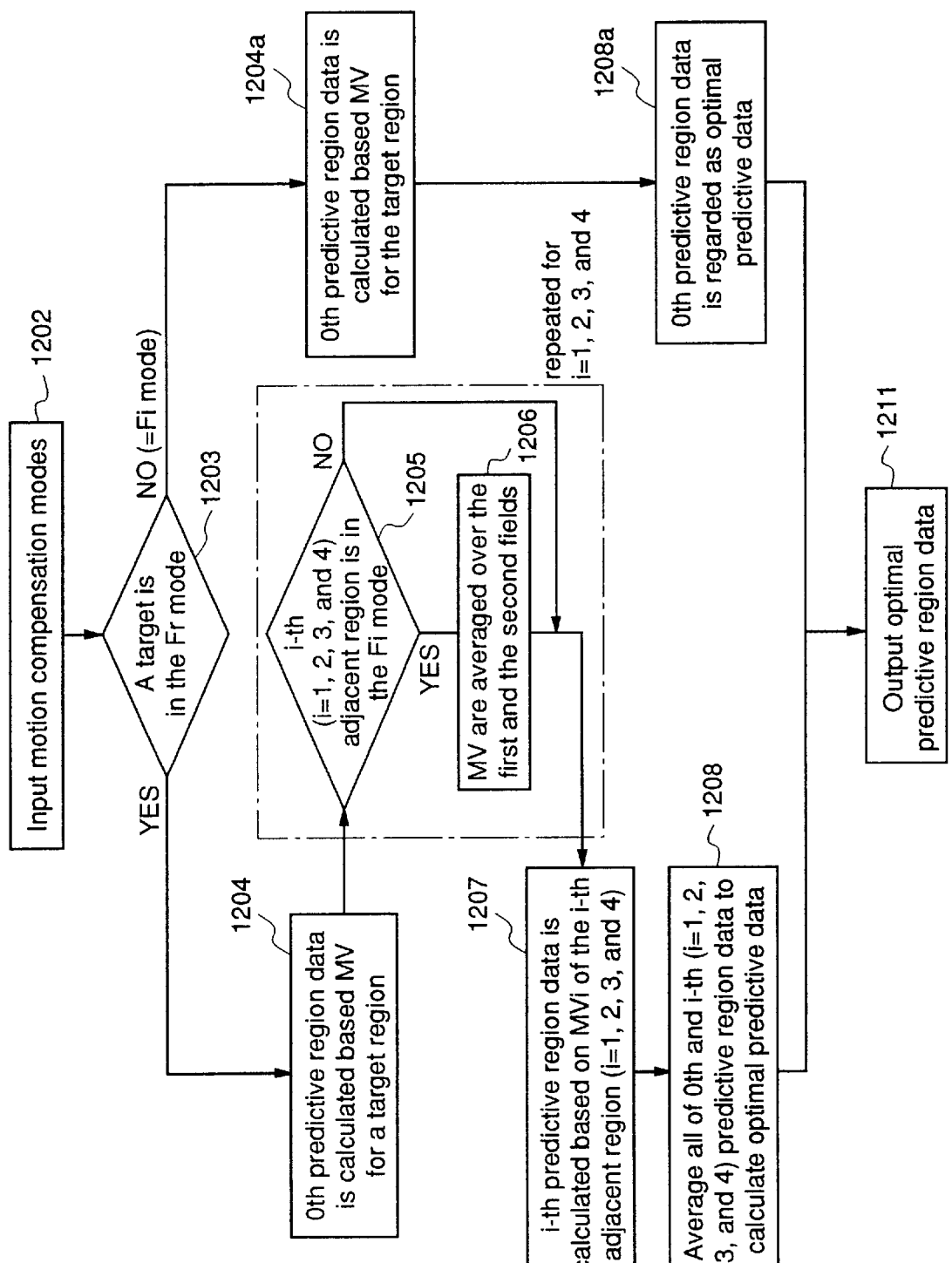
FIG. 12 is a flowchart showing a method of generating a predictive image in an image predictive decoding method in accordance with a sixth embodiment of this invention.

In step 812, the target odd field predictive region data and the first odd field predictive region data (i), and the target even field predictive region data and the first even field predictive region data (i) each are averaged by the equation (1). The averaged odd and even field data are arranged in a frame structure to produce optimal predictive region data, just as shown in FIG. 12(*a*).

That is, when the motion compensation mode of a target block is different from that of the adjacent block, it is assumed that the motion compensation mode of the adjacent block is the same as that of the target block, and then, the calculation is performed.

In the fourth embodiment, when overlapped motion compensation is performed to an interlaced image, if a target block is in the frame predictive mode while the adjacent blocks are in the field predictive mode, assuming that the adjacent block has the frame motion vector, two field motion vectors of the adjacent block are averaged to generate an averaged frame motion vector, just as both the target block and the adjacent block are in the frame predictive mode. If the target block is in the field predictive mode while the adjacent blocks are in the frame predictive mode, assuming that the adjacent block has two field motion vectors, first and second field motion vectors are produced based on the field motion vectors of the target block and the frame motion vector of the adjacent block, just as both the target block and the adjacent block are in the field predictive mode. Subsequently, the predictive regions are overlapped and averaged. As a result, when a target region is in the frame motion compensation mode while the adjacent region is in the field motion compensation mode, even if adjacent predictive region data, which is calculated based on the motion vector of at least an adjacent region to the target region, is calculated based on the averaged frame motion vector of the adjacent region resulting from averaging the first and second field motion vectors of the target region, there is provided a solution to the problems that a high-frequency component is introduced to a static region, and that the temporal resolution of a region having a large motion is reduced.

In the fourth embodiment, in step 803, even when all of a target region and the adjacent regions are not in the same predictive mode, but the target region and some of the adjacent regions are in the same predictive mode, for the target region and the adjacent region that have the same predictive mode, a process equivalent of steps 810, 811, and 812 in FIG. 8 using the average by the equation (2) in step 206 of FIG. 2, or using the average by the equation (3) in steps 510 and 511 of FIG. 5 may be carried out to improve precision of the prediction.

Embodiment 5

Figure 9:
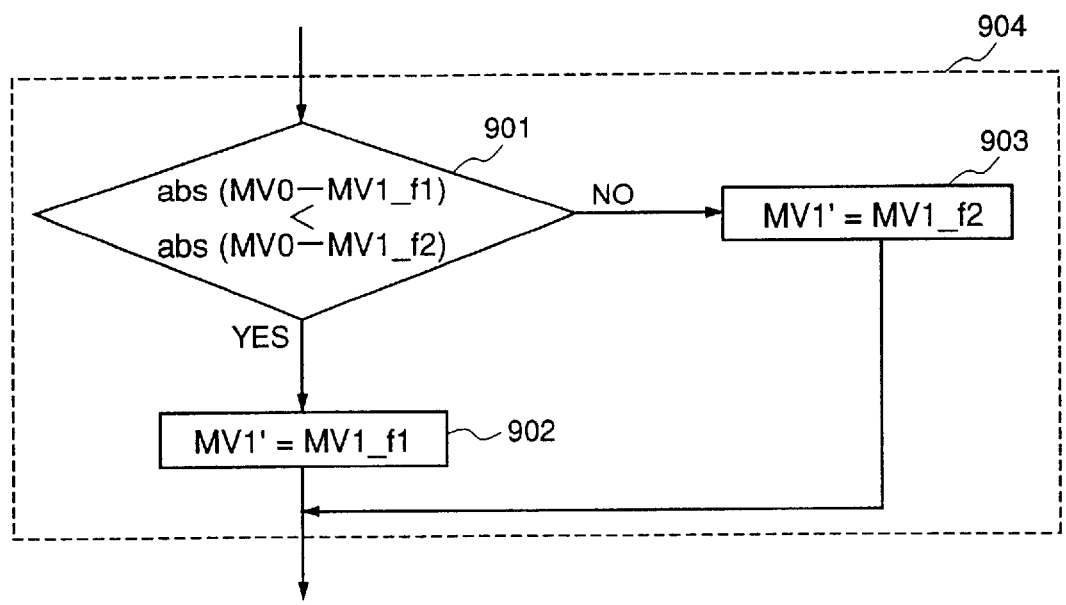
FIG. 9 is a flowchart showing a method of generating a predictive image in a image predictive decoding method in accordance with a fifth embodiment.
Figure 10:
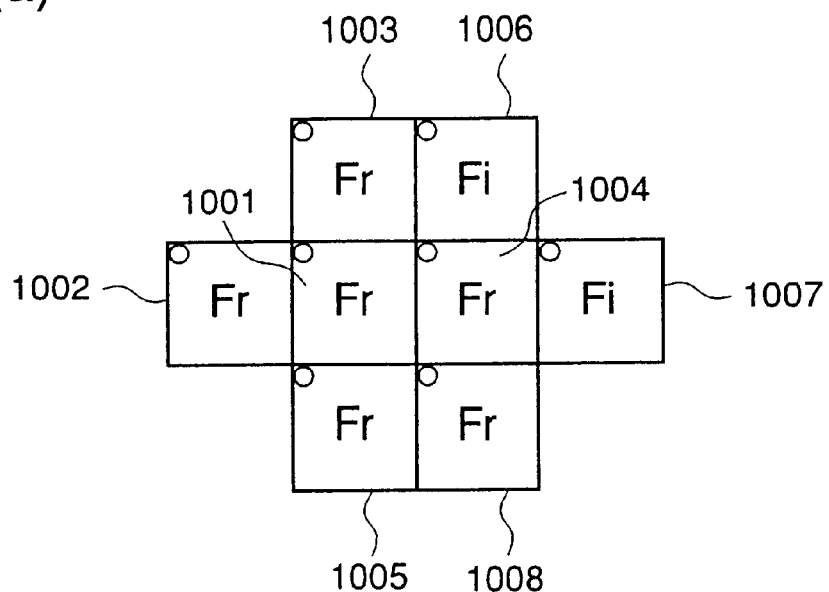
FIGS. 10(a) and 10(b) are diagrams for describing the method of generating a predictive image in the first embodiment.
Figure 10:
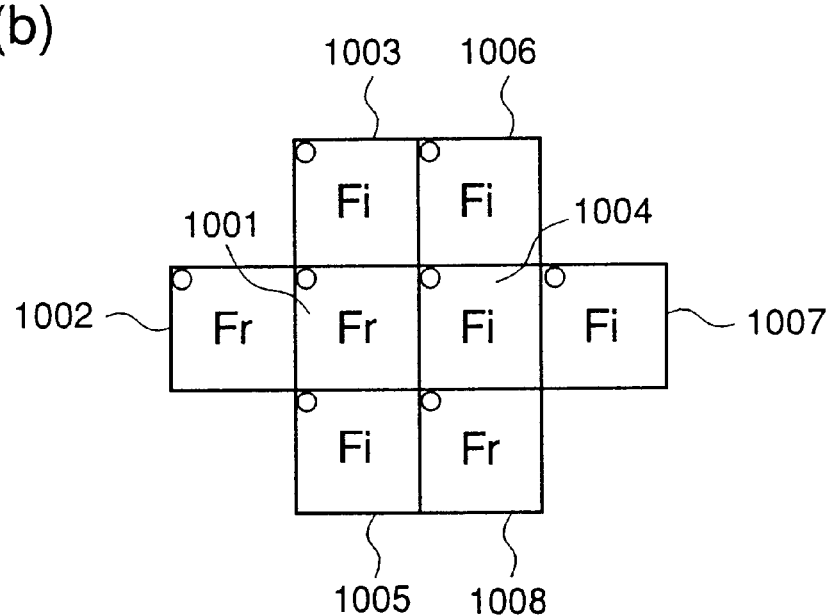
Figure 11:
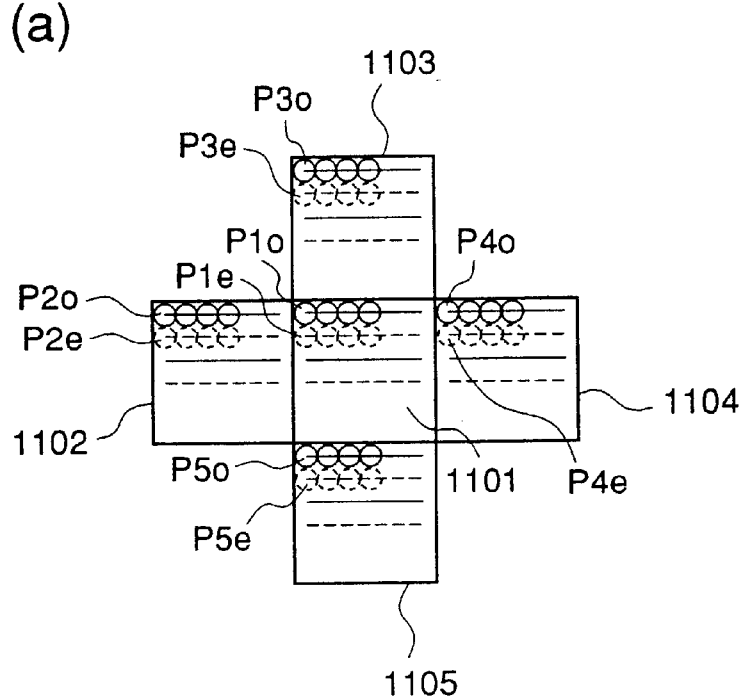
FIGS. 11(a) and 11(b) are diagrams for explaining the method of generating a predictive image in the third embodiment.
Figure 11:
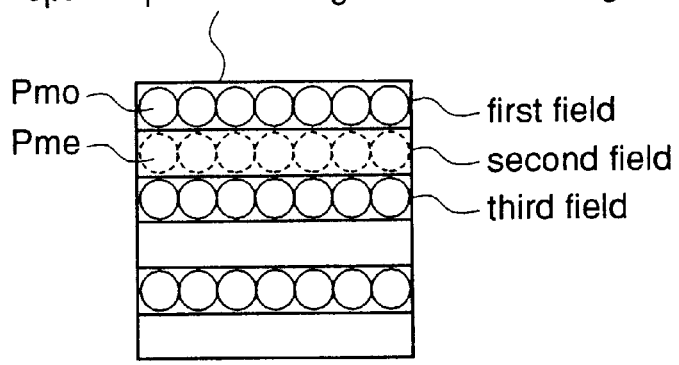

FIG. 9 is a flowchart showing a method of generating a predictive image in an image predictive decoding method in accordance with a fifth embodiment.

In the image predictive decoding method of the fifth embodiment, which corresponds to claim 6, step 904 is used in place of step 806 in FIG. 8 of the fourth embodiment. When a target block is in the frame predictive mode while the adjacent block is in the field predictive mode, the field motion vector of the adjacent block approximating to the frame motion vector of the target block is used. This is shown in steps 901 and 902. When a difference between the frame motion vector of the target block MV0 and the odd-numbered field motion vector of the adjacent block MV1_f1 is smaller than a difference between the frame motion vector of the target block MV0 and the even-numbered field motion vector of the adjacent block MV1_f2, it is assumed that the averaged frame motion vector of the adjacent block MV1' is equal to the odd-numbered field motion vector of the adjacent block MV1_f1. When a difference between the frame motion vector of the target block MV0 and the even-numbered field motion vector of the adjacent block MV1_f2 is smaller than a difference between the frame motion vector of the target block MV0 and the odd-numbered field motion vector of the adjacent block MV1_f1, it is assumed that the averaged frame motion vector of the adjacent block MV1' is equal to the even-numbered field motion vector of the adjacent block MV1_f2. Thereafter, predictive data and first predictive region data are calculated based on the frame motion vector MV0 of the target block and the averaged frame motion vector MV1' of the adjacent block in step 807, respectively. The other portions of the process are the same as those in the fourth embodiment.

As hereinbefore pointed out in the fifth embodiment, instead of using step 806 in FIG. 8 in the fourth embodiment, when a target block is in the frame predictive mode while the adjacent block is in the field predictive mode, the predictive data of the adjacent region is calculated using the field motion vector of the adjacent block which is closer to the frame motion vector of the target block. Therefore, just as in the fourth embodiment, there is provided a solution to the problems that a high-frequency component is introduced to a static region, and that the temporal resolution of a region having a large motion is reduced. Furthermore, higher precision overlapped motion compensation can be performed.

Embodiment 6

FIG. 12 is a flowchart showing a method of generating a predictive image in an image predictive decoding method in accordance with a sixth embodiment of this invention.

In the image predictive decoding method corresponding to claim 8, when a target region is in the frame motion compensation mode, overlapped motion compensation is carried out, while when the target region is in the field motion compensation mode, the overlapped motion compensation is not performed, that is, the target predictive region data and the adjacent predictive region data are not weightedly averaged.

The operation of the image predictive decoding method of the sixth embodiment will be described with reference to the flowchart in FIG. 12.

Initially, in step 1202, information about the motion compensation mode of a target block to bed decoded, i.e., information on whether the target block is in the frame compensation mode or the field compensation mode, is input. In step 1203, it is decided whether the target block is in the frame compensation (Fr) mode or not. Thereafter, when the target block is in the Fr mode, 0th predictive data is calculated based on the motion vector of the target block in step 1204. In step 1205, it is decided whether the i-th (i=1, 2, 3, and 4) adjacent region is in the Fi mode or not. When the adjacent region is in the Fi mode, the first and second field motion vectors are averaged in step 1206, and the process goes to step 1207. When it is decided in step 1205 that the adjacent region is in the Fr mode (not in the Fi mode), the process directly goes to step 1207. Steps 1205 to 1207 are repeated from i=1 to j-4. In step 1207, i-th predictive region data is calculated based of MVi of the i-th adjacent region (i=1, 2, 3, and 4). Further, in step 1208, the 0th to 4th predictive region data are averaged, and the result is regarded as optimal predictive data. In step 1209, the optimal predictive data is output.

On the other hand, when in step 1203 the target block is not in the Fr mode, but in the Fi mode, only step 1204a which is the same as step 1204 is performed. In step 1208a, the 0th predictive data is regarded as optimal predictive data. In step 1209, the optimal predictive data is output.

In the image predictive decoding method of the sixth embodiment, when a target image is in the field motion compensation mode, overlapped motion compensation will not be carried out for the target image and the adjacent pixels. Therefore, there is provided a solution to the problems that overlapped motion compensation causes an increase in unnecessary high-frequency components, and that the temporal resolution of a region having a large motion is reduced by overlapped motion compensation.

Embodiment 7

Next, a description will be given of an image predictive coding apparatus coding a signal which is to be decoded by an image predictive decoding method performed by the image predictive decoding apparatus according to the present invention.

Figure 13:
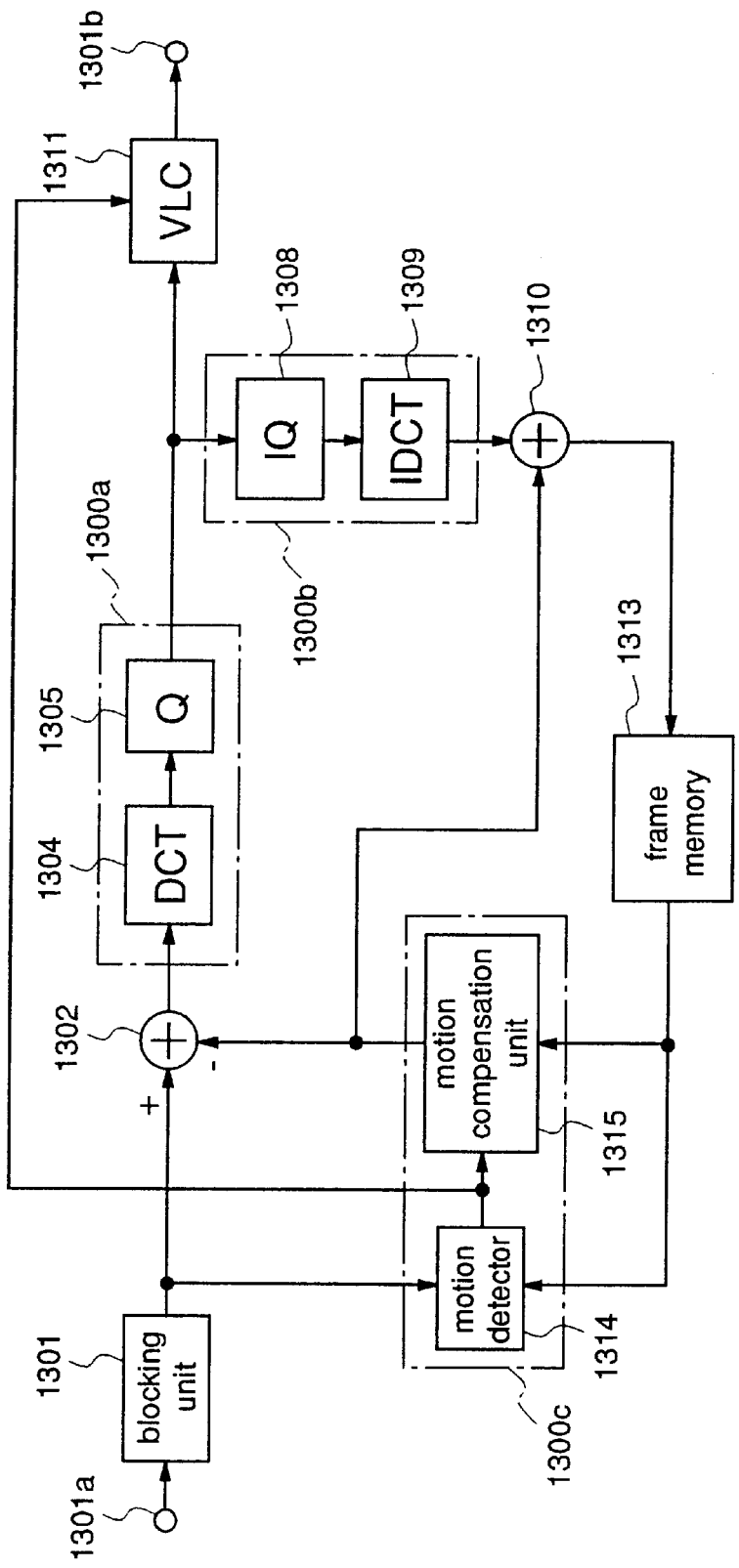
FIG. 13 is a block diagram for explaining an image predictive coding apparatus in accordance with a seventh embodiment.

FIG. 13 is a block diagram showing an image predictive coding apparatus in accordance with a seventh embodiment of this invention, corresponding to claim 10. In the figure, reference numeral 1301a designates an input terminal to which the digital image signal of each frame is input; 1301, a blocking unit for dividing the input digital image signal into blocks (image space) each having 16×16 pixels as a unit of coding, and outputting image data corresponding to each block; 1300c, a predictive data generator deciding the predictive mode corresponding to the data of a target block of a frame being currently processed, from the blocking unit 1301, generating predictive data (data of a predictive block), and comprising a motion detector 1314 and a motion compensation unit 1315; 1302, a first adder outputting a difference between the data of the target block and the data of the predictive block, as residual block data (predictive error signal); 1300a, an encoder compressing an output of the first adder 1302, and outputting compressed residual block data, and comprising a discrete cosine transformer (DCT) 1304 and a quantizer 1305; 1311, a variable length encoder (VLC) subjecting an output of the encoder 1300a to variable length coding, and outputting a coded signal to an output terminal 1301b; 1300b, a decoder decompressing an output of the encoder 1300a, and outputting decompressed residual block data, and comprising an inverse quantizer 1308 and an inverse discrete cosine transformer (IDCT) 1309; 1310, a second adder adding the decompressed residual block data and the data of the predictive block, and outputting reproduced block data; and 1313, a frame memory storing an output of the second adder (the reproduced block data) as reference image data to a frame to be processed in the next time, the reference image data being supplied to the predictive data generator 1300c.

A description will be given of the operation of the image predictive coding apparatus according to the seventh embodiment.

When a digital image signal is input to the input terminal 1301a, the image signal is divided into blocks by the blocking unit 1301. Thereafter, the data of a target block to be coded is input to the motion detector 1314, while the previous data of a reproduced image (reference image) is input to the motion detector 1314. The motion detector 1314 decides the predictive mode of the target block, and, based on the data of a reference image corresponding to a frame being currently processed, outputs motion displacement information indicating a predictive block that has image data having the least error to the image data of the target block, as a motion vector, using such a method as block matching. As a predictive mode, there are the frame predictive mode and the field predictive mode, described above. A mode is decided by the same way of MPEG2. The decided mode is transmitted along with the motion vector to the variable length encoder 1311 and the motion compensation unit 1315.

The motion vector is input to the motion compensation unit 1315. The motion compensation unit 1315, based on the reference image data corresponding to the current frame, generates the data of a predictive block corresponding to the target block. The motion vector is also input to the variable length encoder (VLC) 1311, where the motion vector is converted to variable length codes. The codes are output to the output terminal 1301b.

Based on the target block data and the predictive block data, the first adder calculates a difference between those data as a residual block data.

Next, the residual block data is compressed. That is, the discrete cosine transformer (DCT) 1304 subjects the residual block data to discrete cosine transform (DCT) to transform into frequency components. In this case, the data is divided into small regions, i.e., blocks consisting of 8×8 pixels. The invention is not necessarily restricted to this. The frequency components are quantized by the quantizer 1305 to be converted to quantized coefficients. The quantized coefficients are output as the data of a compressed block to the variable length encoder (VLC) 1311, where the quantized coefficients are converted to variable length codes. Along with coded data including the motion vector and other subsidiary information, the variable length codes are output as a coded image signal through the output terminal 1301b.

The compressed block data is also input to the decoder 1300b where the compressed block data is decompressed. That is, the compressed block data is inversely quantized by the inverse quantizer 1408 to be converted to frequency components. The frequency components are restored to data in the spatial region by the inverse discrete cosine transformer (ICDT) 1309. The data in the spatial region is the residual block data (the data of a decompressed block). The decompressed block data is added with the predictive block data by the second adder 1310. A result of the addition is stored in the frame memory 1313 as the data of a restored block.

The image predictive coding apparatus of the seventh embodiment can comprise an image predictive coding apparatus corresponding to the image predictive decoding apparatus of each of the first to sixth embodiments, i.e., the image predictive coding apparatus which generates coded signals to be image predictively decoded by the image predictive decoding apparatus. In each image predictive coding apparatus, the predictive data generator 1300c performs predictive data generation equivalent to the predictive data generation in the image predictive decoding method of each of the first to sixth embodiments.

Embodiment 8

What is more, a decoding program for realizing the image predictive decoding apparatus according to the first to sixth embodiments, or an encoding program for realizing the image predictive coding method in the image predictive coding apparatus according to the seventh embodiment, is recorded in a data storage medium, such as a floppy disk. Thereby, the process shown in each embodiment can be easily carried out in an independent computer system.

Figure 14:
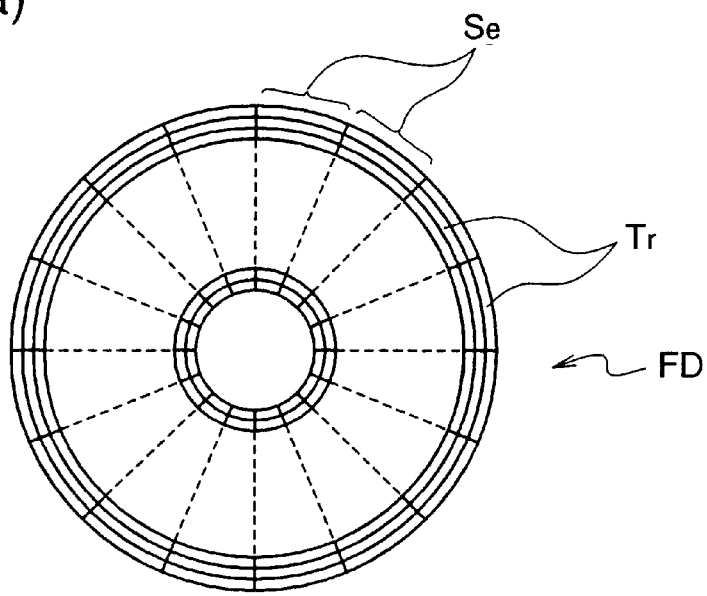
FIGS. 14(a), 14(b), and 14(c) are diagrams for explaining a data storage medium in accordance with an eighth embodiment, storing a program for realizing the image predictive decoding method of each above embodiment with a computer system.
Figure 14:
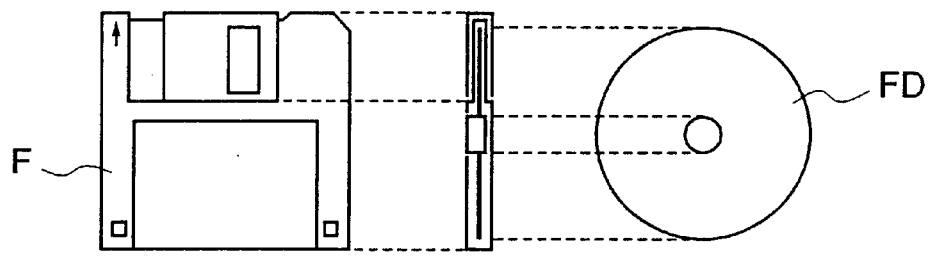
Figure 14:
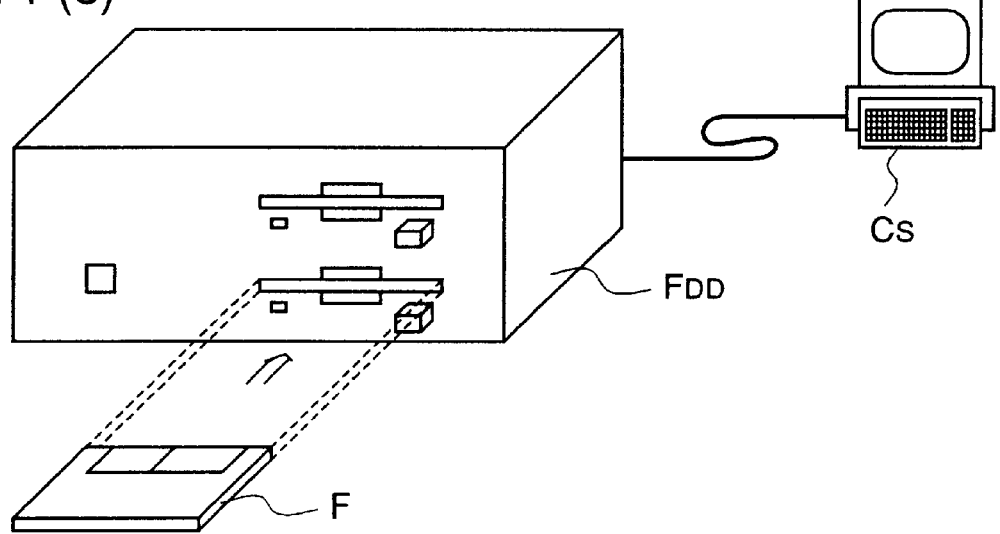

FIGS. 14(*a*) to 14(*c*) are diagrams for describing a case where a computer system carries out the image predictive decoding in accordance with the first to sixth embodiments, using a floppy disk storing the decoding program, or the image predictive coding in accordance with the seventh embodiment, using a floppy disk storing the coding program.

FIG. 14(*b*) shows the front view of an outside appearance, a section view, and a disk of the floppy disk of a sixth embodiment of this invention. FIG. 14(*a*) shows an example of physical format of the disk that is the core of the storage medium. The disk FD is contained in a jacket F. On the surface of the disk, a plurality or tracks Tr are formed. The tracks are concentric circles arranged from an outer circumstance to an inner circumstance. Each track is divided into 16 pieces of sectors Se around the center. Accordingly, in a floppy disk storing the program, the data of the program are recorded in an allocated region of the disk Fd.

Further, FIG. 14(*c*) shows a system for recording and reproducing the program on the disk FD. When the program is recorded on the floppy disk, a computer system Cs writes the program data on the floppy disk via a floppy disk drive. When the image predictive decoding method is implemented in the computer system by means of a program stored in the floppy disk, the program is read out from the floppy disk via the floppy disk drive, and transmitted to the computer system.

Although in the above description a floppy disk is used as a data storage medium, an optical disk can be similarly used. Further, a storage medium is not restricted to this. Something that can record a program, such as an IC card and a ROM cassette, can be similarly applicable within the scope of this invention.

What is claimed is:

1. An image predictive decoding method including a decoding method in which when decoding compressively coded image data resulting from predicting the data of a predictive region to a target region, using information about a plurality of motion compensation modes, and a plurality of motion vectors corresponding to the plurality of motion compensation modes, and performing coding for a target region to be decoded, target predictive region data calculated based on the motion vector of the target region, and adjacent predictive region data calculated based on the motion vector of at least one adjacent region to the target region, are weightedly averaged to produce optimal predictive region data to the target region, and switching a mode in view of interlacing at calculating weightedly averaged data values, said image predictive decoding method calculating the adjacent predictive region data, which is calculated based on the motion vector of at least one adjacent region to the target region, based only on the motion vector of the adjacent region having the same motion compensation mode as the target region, to produce the optimal predictive region data.

2. An image predictive decoding method including a decoding method in which when decoding compressively coded image data including information about a plurality of motion compensation modes, and a plurality of motion vectors corresponding to the plurality of motion compensation modes, for a target region to be decoded, target predictive region data calculated based on the motion vector of the target region, and adjacent predictive region data calculated based on the motion vector of at least one adjacent region to the target region, are weightedly averaged to produce optimal predictive region data to the target region, and switching a mode in view of interlacing at calculating weightedly averaged data values, said image predictive decoding method calculating the adjacent predictive region data, which is calculated based on the motion vector of at least one adjacent region to the target region, based on the motion vector of the adjacent region when the adjacent region has the same motion compensation as the target region, or based on the motion vector of the target region when the adjacent region has a motion compensation mode different from that of the target region, to produce the optimal predictive region data.

3. The image predictive decoding method of claim 1 includes, as the motion compensation mode, a frame motion compensation mode in which the data of the even-numbered field and odd-numbered field of a predictive region are calculated based on the same motion vector, and a field motion compensation mode in which the data of the even-numbered field of a predictive region are calculated based on a first field motion vector, and the data of the odd-numbered field of the predictive region is calculated based on a second field motion vector.

4. An image predictive decoding method including a decoding method in which when decoding compressively coded image data resulting from predicting predictive region data to a target region, using information about a frame motion compensation mode motion vector, information about a field motion compensation mode in which the data of the even-numbered field of the predictive region is calculated based on a first field motion vector, and the data of the odd-numbered field of the predictive region is calculated based on a second field motion vector, and motion vectors corresponding to the plurality of motion compensation modes, and performing coding, for a target region to be decoded, target predictive region data calculated based on the motion vector of the target region, and adjacent predictive region data calculated based on the motion vector of at least one adjacent region to the tax-get region, are weightedly averaged to produce optimal predictive region data to the target region, and switching a mode in view of interlacing at calculating weightedly averaged data values, said image predictive decoding method, when the motion compensation modes of the target region and the adjacent region are the field motion compensation modes, calculating the data of an odd-numbered field of target predictive region based on the motion vector of the target region, the data of an even-numbered field of target predictive region based on the motion vector of the target region, the data of a first odd-numbered field of predictive region based on the motion vector of the adjacent region, the data of an even-numbered field of predictive region based on the motion vector of the adjacent region, weightedly averaging the data of an odd-numbered field of target predictive region and the data of a first off-numbered field of predictive region, and the data of an even-numbered field of target predictive region and the data of a first even-numbered field of predictive region, to produce averaged odd-numbered field data and averaged even-numbered field data, respectively, and arranging the averaged odd-numbered field data and the averaged even-numbered field data in a frame structure, to produce optimal predictive region data.

5. An image predictive decoding method including
a decoding method in which when decoding compressively coded image data resulting from predicting predictive region data to a target region, using information about a frame motion compensation mode in which the data of the even-numbered field and odd-numbered field of the predictive region are calculated based on the same motion vector, information about a field motion compensation mode in which the data of the even-numbered field and odd-numbered field of the predictive region are calculated based on the same motion vector, information about a field motion compensation mode in which the data of the even-numbered field of the predictive region is calculated based on a first field motion vector, and the data of the odd-numbered field of the predictive region is calculated based on a second field motion vector, and motion vectors corresponding to the plurality of motion compensation modes, and performing coding, for a target region to be decoded, target predictive ve region data calculated based on the motion vector of the target region, and adjacent predictive region data calculated based on the motion vector of at least one adjacent region to the target region, are weightedly averaged to produce optimal predictive region data to the target region, and switching a mode in view of interlacing at calculating weightedly averaged data values, said image predictive decoding method, when the target region is in the frame motion compensation mode while the adjacent region is in the field motion compensation, calculating the adjacent predictive region data, which is calculated based on the motion vector of at least one adjacent region to the target region, based on an averaged frame motion vector of the adjacent region resulting from averaging the first field motion vector of the adjacent region and the second field motion vector of the adjacent region.

6. An image predictive decoding method including
a decoding method in which when decoding compressively coded image data resulting from predicting predictive region data to a target region, using information about a frame motion compensation mode in which the data of the even-numbered field and odd-numbered field of the predictive region are calculated based on the same motion vector, information about a field motion compensation mode in which the data of the even-numbered field of the predictive region are calculated based on a first field motion vector, and the data of the odd-numbered field of the predictive region are calculated based on a second field motion vector, and motion vectors corresponding to the plurality of motion compensation modes, and performing coding, for a target region to be decoded, target predictive region data calculated based on the motion vector of the target region, and adjacent predictive region data calculated based on the motion vector of at least one adjacent region to the target region, are weightedly averaged to produce optimal predictive region data to the target region, and switching a mode in view of interlacing at calculating weightedly averaged data values, said image predictive decoding method, when the target region is in the frame motion compensation mode while the adjacent region is in the field motion compensation, calculating the adjacent predictive region data, which is calculated based on the motion vector of at least one adjacent region to the target region, based on one of the first field motion vector of the adjacent region and the second field motion vector of the adjacent region, which has the smaller difference from the motion vector of the target region.

7. An image predictive decoding method including
a decoding method in which when decoding compressively coded image data resulting from predicting predictive region data to a target region, using information about a frame motion compensation mode in which the data of the even-numbered field and odd-numbered field of the predictive region are calculated based on the same motion vector, information about a field motion compensation mode in which the predictive data of the even-numbered field of the predictive region is calculated based on a first field motion vector, and the predictive data of the odd-numbered field of the predictive region is calculated based on a second field motion vector, and motion vectors corresponding to the plurality of motion compensation modes, and performing coding, for a target region to be decoded, target predictive region data calculated based on the motion vector of the target region, and adjacent predictive region data calculated based on the motion vector of at least one adjacent region to the target region, are weightedly averaged to produce optimal predictive region data to the target region, and switching a mode in view of interlacing at calculating weightedly averaged data values, said image predictive decoding method, when the target region is in the field motion compensation mode while the adjacent region is in the frame motion compensation, calculating a second field motion vector of the adjacent region, based on a first field motion vector of the target region, a second field motion vector of the target region, and a first field motion vector of the adjacent region equal to the frame motion vector of the adjacent region in assuming that the adjacent region has the information about a field motion compensation mode in which the predictive data of the even-numbered field of the predictive region is calculated based on a first field motion vector, and the predictive data of the odd-numbered field of the predictive region is calculated based on a second field motion vector, and producing the adjacent predictive region data using the first- and second field motion vectors of the adjacent region.

8. An image predictive decoding method including
a decoding method in which when decoding compressively coded image data resulting from predicting the data of a predictive region to a target region, using information about a plurality of motion compensation modes, and a plurality of motion vectors corresponding to the plurality of motion compensation modes, and performing coding, for a target region to be decoded, target predictive region data calculated based on the motion vector of the target region, and adjacent predictive region data calculated based on the motion vector of at least one adjacent region to the target region, are weightedly averaged to produce optimal predictive region data to the target region, and switching a mode in view of interlacing at calculating weightedly averaged data values, same image predictive decoding method calculating the adjacent predictive region data, when the target region is in the frame motion compensation mode, weightedly averaging the target predictive region data and the adjacent predictive region data, to produce the optimal predictive region data to the target region, while when the target region is in the field motion compensation mode, the optimal predictive region data to the target region is calculated based only on the motion vector of the target region.

9. The image predictive decoding method of claim 8 wherein when the target region is in the frame motion compensation mode, optical predictive region data to the target region is calculated in a way in which it is decided whether each adjacent region to the target region is in the field motion compensation mode, or not, and when the adjacent region is in the field motion compensation mode, the first and second motion vectors of the adjacent region are averaged, predictive region data to the adjacent region is calculated based on the averaged filed motion vector of the adjacent region, and the target predictive region data and all of the adjacent predictive region data are averaged to produce the optimal predictive data to the target region.

10. An image predictive decoding apparatus comprising:

a frame memory;

an input unit for receiving compressively coded image data including information about a plurality of motion compensation modes, and a plurality of motion vectors corresponding to the plurality of motion compensation modes;

a data analyzer for analyzing the compressively coded image data, and outputting at least the information about the plurality of motion compensation modes, the plurality of motion vectors corresponding to the plurality of motion compensation modes, and image transform coefficients;

a decoder for restoring the image transform coefficients with a prescribed method to a decompressed difference image;

a predictive image generator for generating an optimal predictive image based on a reference image stored said frame memory; and an adder for adding the decompressed difference image and the optimal predictive image to produce a reproduced image, outputting the same, and storing the same in said frame memory, said predictive image generator producing optimal predictive region data using the image predictive decoding method of any of claim 1 to claim 9.

11. An image predictive coding apparatus comprising:

a frame memory;

an output unit;

an input unit for receiving a digital image signal of each frame;

a predictive data generator for generating the data of a predictive block based on a reference image stored in said frame memory;

a first adder for outputting difference data between the data of a target block and the data of the predictive block, as the data of a residual block;

an encoder for compressing the data of the residual block and, outputting the compressed data of the residual block;

a variable length encoder for subjecting the compressed data of the residual block to variable length coding, and outputting the resulting coded signal through said output unit;

a decoder for decompressing the compressed data of the residual block, and outputting the decompressed data of the residual block; and a second adder for adding the decompressed data of the residual block to the data of the predictive block, outputting the data of a resulting reproduced block, and storing the data of the reproduced data is said frame memory, said predictive data generator performing predictive data production corresponding to the optimal predictive region data production in the image predictive decoding method of any of claim 1 to claim 9.

12. A data storage medium storing a program for performing the image predictive decoding method of claim 1, using a computer.

* * * * *

UNITED STATES PATENT AND TRADEMARK OFFICE
CERTIFICATE OF CORRECTION

PATENT NO.     : 6,359,929 B1
DATED          : March 19, 2002
INVENTOR(S)    : Choong Seng Boon It is certified that error appears in the above-identified patent and that said Letters Patent is hereby corrected as shown below:

Column 22,
Line 46, after "mode" insert -- in which the data of the even-numbered field and odd-numbered field of the predictive region are calculated based on the same --.

Column 23,
Line 25, delete "information about a field motion";
Lines 26-28, delete in their entirety;
Line 29, delete "vector,"

Column 25,
Line 12, change "same" to -- said --.

Signed and Sealed this

Twenty-seventh Day of May, 2003

JAMES E. ROGAN
*Director of the United States Patent and Trademark Office*